United States Patent
Nonaka et al.

(10) Patent No.: US 9,742,506 B2
(45) Date of Patent: Aug. 22, 2017

(54) TERMINAL DEVICE, CONTROL DEVICE, FAULT DIAGNOSIS SYSTEM, AND FAULT DIAGNOSIS METHOD

(71) Applicant: Panasonic Intellectual Property Corporation of America, Torrance, CA (US)

(72) Inventors: Masao Nonaka, Osaka (JP); Masaru Yamaoka, Osaka (JP); Kazunori Kurimoto, Hyogo (JP); Kazuhiro Kuroyama, Osaka (JP); Michihiro Matsumoto, Shiga (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 284 days.

(21) Appl. No.: 14/112,193

(22) PCT Filed: Feb. 25, 2013

(86) PCT No.: PCT/JP2013/001058
§ 371 (c)(1),
(2) Date: Oct. 16, 2013

(87) PCT Pub. No.: WO2013/128873
PCT Pub. Date: Sep. 6, 2013

(65) Prior Publication Data
US 2014/0065971 A1     Mar. 6, 2014

(30) Foreign Application Priority Data

Feb. 28, 2012  (JP) ................................ 2012-042136

(51) Int. Cl.
*H04B 17/00* (2015.01)
*G06F 11/07* (2006.01)

(52) U.S. Cl.
CPC ........... *H04B 17/00* (2013.01); *G06F 11/079* (2013.01); *G06F 11/0736* (2013.01)

(58) Field of Classification Search
CPC ........... H04L 12/2825; H04L 2012/285; H04L 45/28; H04L 2209/80; H04L 2012/2841;
(Continued)

(56) References Cited

U.S. PATENT DOCUMENTS 6,122,750 A   9/2000  Hayasaka
7,672,291 B2 * 3/2010  Wang .................. H04W 76/023
                                                            370/337
(Continued)

FOREIGN PATENT DOCUMENTS

CN   1221148     6/1999
JP   3-204736    9/1991
(Continued)

OTHER PUBLICATIONS

International Search Report issued Apr. 16, 2013 in International (PCT) Application No. PCT/JP2013/001058.
(Continued)

*Primary Examiner* — Alejandro Rivero
*Assistant Examiner* — Maryam Soltanzadeh
(74) *Attorney, Agent, or Firm* — Wenderoth, Lind & Ponack, L.L.P.

(57) ABSTRACT

A state updating unit updates first information stored in a storage unit whenever the state of a control unit transitions from an idle state to an active state or from the active state to the idle state. A second power supply unit induces electric power from radio waves received by the antenna unit. An information acquiring unit operates after receiving the supply of electric power from the second power supply unit, acquires second information indicating whether electric power is supplied from the first power supply unit, acquires
(Continued)

the first information from the storage unit, and transmits the acquired first and second information to the control device. A diagnosing unit diagnoses faults in the terminal device based on the first and second information transmitted from the information acquiring unit of the terminal device.

15 Claims, 15 Drawing Sheets

(58) Field of Classification Search
CPC .. H04B 1/3883; H04B 1/1607; H04B 5/0037; H04B 7/0426; H04B 10/807; H04B 17/00; H04W 4/008; H04W 52/0261; H04W 52/0277; H04W 52/0296; G06F 11/0736; G06F 11/079
See application file for complete search history.

(56) References Cited

U.S. PATENT DOCUMENTS

| | | | | |
|---|---|---|---|---|
| 7,804,722 | B2* | 9/2010 | Jang | G11O 5/145 365/185.18 |
| 8,629,753 | B2* | 1/2014 | Yum | F25D 29/00 340/3.1 |
| 9,164,660 | B2* | 10/2015 | Jung | G06F 3/0482 |
| 2006/0013187 | A1 | 1/2006 | Wang | |
| 2008/0073057 | A1* | 3/2008 | Kojima | B60H 1/00735 165/43 |
| 2008/0184218 | A1* | 7/2008 | Largman | G06F 21/575 717/168 |
| 2009/0027957 | A1 | 1/2009 | Jang | |
| 2010/0283573 | A1 | 11/2010 | Yum et al. | |
| 2012/0217819 | A1* | 8/2012 | Yamakawa | B60L 11/182 307/104 |
| 2012/0246356 | A1* | 9/2012 | Shibata | G06F 1/3243 710/48 |

FOREIGN PATENT DOCUMENTS

| | | |
|---|---|---|
| JP | 2006-262021 | 9/2006 |
| JP | 2011-81660 | 4/2011 |

OTHER PUBLICATIONS

Office Action and Search Report issued Nov. 4, 2015 in Chinese Application No. 201380001042.0, with partial English translation.

* cited by examiner

| | SECOND INFORMATION POWER-SUPPLY STATE | NON-POWER-SUPPLY STATE |
|---|---|---|
| FIRST INFORMATION | | |
| ACTIVE STATE | a) NORMAL (ACTIVE) | d) FAULT |
| IDLE STATE | c) FAULT | b) NORMAL (IDLE) |

| FIRST INFORMATION \ SECOND INFORMATION | POWER-SUPPLY STATE | | NON-POWER -SUPPLY STATE |
|---|---|---|---|
| | THIRD INFORMATION=ON | THIRD INFORMATION=OFF | |
| ACTIVE STATE | a) NORMAL (ACTIVE) | x) FAULT | d) FAULT |
| IDLE STATE | c) FAULT | y) NORMAL (IDLE) ※SWITCH OFF | b) NORMAL (IDLE) ※PLUG OFF |

TERMINAL DEVICE, CONTROL DEVICE, FAULT DIAGNOSIS SYSTEM, AND FAULT DIAGNOSIS METHOD

TECHNICAL FIELD

The present invention relates to a technique of allowing a terminal device and a control device to perform short-range wireless communication to diagnose a fault in the terminal device.

BACKGROUND ART

In recent years, a fault diagnosis function is mounted on home appliances such as a washing machine, a refrigerator, and an air-conditioner, and users can smoothly cope with repairs by using the fault diagnosis function. Specifically, when a fault occurs in a home appliance, an error code is displayed on a display panel of the home appliance, and the user accesses a fault diagnosis site on the Internet and inputs the error code, and the necessity of an on-site service is determined. When it is determined that the on-site service is necessary, a service technician's visit is arranged. When it is determined that the on-site service is not necessary, the user is notified of measures to be taken with respect to the home appliance. In this manner, an unnecessary visit of the service technician is prevented, and a quick and low-cost repair service can be realized.

Patent Document 1 discloses a technique in which when an abnormality notification is sent from devices (for example, CPU, CH, MSU, MCU, and SVP) that constitute a computer system, an analysis program reads hardware information and power information from the devices and creates a code indicating a power abnormality when the power information indicates a power abnormality. On the other hand, the analysis program creates a code indicating an abnormality in a device specified from the hardware information when the power information does not indicates a power abnormality.

Patent Document 2 discloses a technique in which a power supply voltage for completing the control of at least one read or write access is stored in a capacitor, and the control of read or write access to a storage unit is completed using the voltage stored in the capacitor when a power abnormality is detected by a detection circuit.

However, techniques for effectively coping with repairs by pairing a high-function mobile device such as a smartphone or a tablet terminal that is widely used in recent years with a home appliance have been proposed. Specifically, the technique are a method in which when the mobile device is held over the home appliance, the mobile device and the home appliance perform short-range wireless communication and diagnosis results for the home appliance are displayed on a display panel of the mobile device.

However, in the technique of Patent Document 1, a fault is diagnosed using the hardware information and the power information individually, and fault diagnosis is not performed based on a combination of both items of information. Thus, even when the technique of Patent Document 1 is applied to the method of diagnosing a fault in the home appliance by pairing the mobile device and the home appliance, it is difficult to detect whether a microcomputer of the home appliance has a fault or the plug of the home appliance is plugged off.

In addition, the technique of Patent Document 2 is a technique that aims to prevent data from being lost when power supply is interrupted during access to a nonvolatile memory and is not a technique for diagnosing faults.

Patent Document 1: Japanese Patent Application Publication No. H3-204736
Patent Document 2: Japanese Patent Application Publication No. 2011-81660

SUMMARY OF THE INVENTION

An object of the present invention is to provide a technique capable of accurately diagnosing faults in a terminal device when diagnosing faults in the terminal device by pairing a control device and the terminal device.

A terminal device according to an aspect of the present invention is a terminal device which performs short-range wireless communication with an external control device and the faults of which are diagnosed by the control device, the terminal device including: a first power supply unit that supplies electric power; an antenna unit that transmits and receives short-range radio waves to and from the control device; a second power supply unit that induces electric power from the radio waves received by the antenna unit and supplies the induced electric power; a storage unit that operates after receiving the supply of electric power from the second power supply unit; a control unit that operates after receiving the supply of electric power from the first power supply unit and stores in the storage unit first information indicating whether the control unit is in an active state or an idle state; and an information acquiring unit that operates after receiving the supply of electric power from the second power supply unit, acquires second information indicating whether electric power is supplied from the first power supply unit, acquires the first information from the storage unit, and transmits the acquired first and second information to the control device via the antenna unit.

BRIEF DESCRIPTION OF THE DRAWINGS

FIG. 3 is a diagram showing an example of a fault diagnosis table used when a diagnosing unit diagnoses faults.

FIG. 15 is a diagram showing an example of a fault diagnosis table according to the tenth embodiment of the present invention.

DESCRIPTION OF EMBODIMENTS (First Embodiment)

Figure 1:
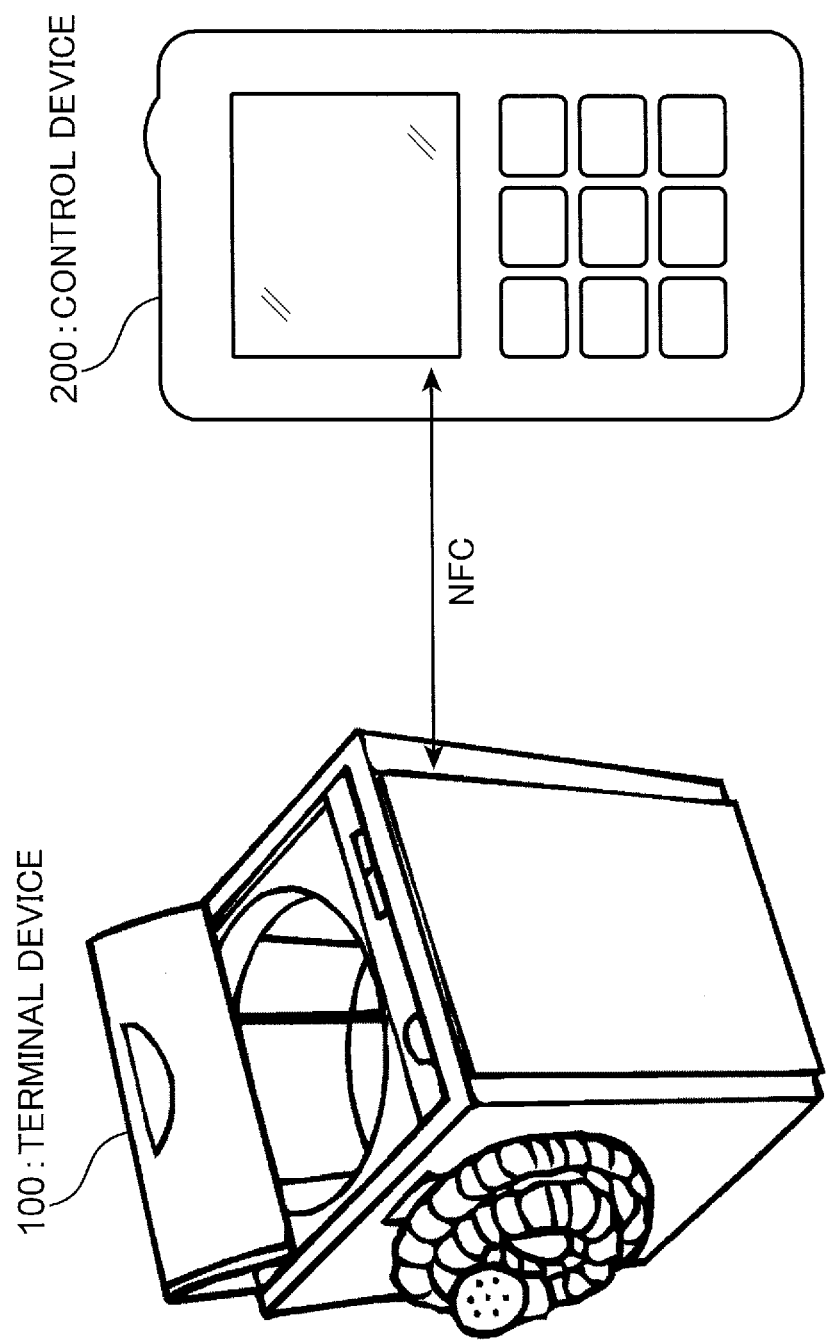
FIG. 1 is an overall configuration diagram of a fault diagnosis system according to a first embodiment of the present invention.

Hereinafter, a fault diagnosis system according to an embodiment of the present invention will be described with reference to the drawings. FIG. 1 is an overall configuration diagram of a fault diagnosis system according to a first embodiment of the present invention. The fault diagnosis system includes a terminal device 100 and a control device 200. The terminal device 100 and the control device 200 both have a short-range wireless communication function. In the fault diagnosis system, when the control device 200 is held over a predetermined position of a housing of the terminal device 100, the terminal device 100 performs short-range wireless communication with the control device 200, the presence of a fault in the terminal device 100 is diagnosed, and the diagnosis result is displayed on a display panel of the control device 200.

Here, although in the example of FIG. 1, a washing machine is employed as the terminal device 100, the present invention is not limited to this, and an optional electric device having a short-range wireless communication function may be employed. For example, a home appliance such as a refrigerator, an air-conditioner, an oven, a microwave, a vacuum cleaner, a rice cooker, or a bread machine may be employed as the terminal device 100, and an AV device such as a television, a blu-ray recorder, or audio equipment may be employed as the terminal device 100.

An optional device having a short-range wireless communication function and a display panel may be employed as the control device 200, and for example, a terminal device such as a smartphone, a tablet terminal, a mobile phone, or a personal data assistance (PDA) may be used.

In recent years, with the introduction of smartphones, tablet terminals, and the like, mobile devices have become sophisticated, and such mobile devices generally have the short-range wireless communication function. Here, the short-range wireless communication is an international wireless communication standard known as near-field communication (NFC) and is a technique of low-power wireless communication performed within a distance of dozens of centimeters.

Therefore, an object of the present embodiment is to provide a technique in which a mobile device having the short-range wireless communication function is employed as the control device 200, the control device 200 and the terminal device 100 are paired, and the diagnosis result of faults in the terminal device 100 is displayed on the display panel of the control device 200 so that diagnosis of faults in the terminal device 100 is performed smoothly.

Next, problems of a fault diagnosis function included in a conventional terminal device will be described. Table 1 is a table showing problems of the fault diagnosis function included in the conventional terminal device, in which a display screen displayed on the display panel of the terminal device 100 according to the state of the terminal device 100 is shown.

TABLE 1

| Plug | Abnormality in microcomputer/other components | Display screen |
|---|---|---|
| IN | No/No | Normal |
| IN | No/Yes | Error code: H01 *** has a fault. |
| OUT | No/No | Is the plug plugged off? |
| Unknown | Yes/Unknown | There is a possibility of faults. Please refer to a nearby store. |

In the "Plug" field of Table 1, "IN" indicates a state where the plug of the terminal device 100 is plugged in, "OUT" indicates a state where the plug of the terminal device 100 is plugged out, (i.e., unplugged) and "Unknown" indicates a state where it is unknown whether the plug of the terminal device 100 is plugged in or out.

In the "Abnormality in microcomputer/other components" field, "No/No" indicates a state where an abnormality is not present in the microcomputer and the other components, "No/Yes" indicates a state where no abnormality is present in the microcomputer, but an abnormality is present in the other components, "No/No" indicates a state where an abnormality is present in the microcomputer and the other components, and "Yes/Unknown" indicates a state where an abnormality is present in the microcomputer, but it is unknown whether an abnormality has occurred in the other components. In the "Display screen" field, a message or the like displayed on the display screen of the control device 200 is shown.

As shown in Table 1, when "Plug" is "IN," and "Abnormality in microcomputer/other components" is "No/No," since the terminal device 100 does not have a fault, a normal operation screen of the terminal device 100 is displayed on the display screen.

When "Plug" is "IN," and "Abnormality in microcomputer/other components" is "No/Yes," since the microcomputer can detect an abnormal component, an error code indicating the cause of the abnormality and the abnormal component are displayed on the display screen.

When "Plug" is "OFF," and "Abnormality in microcomputer/other components" is "No/No," since the microcomputer can detect plugging-out of the plug, a message "Is the plug plugged off?" is displayed on the display screen.

When "Plug" is "Unknown," and "Abnormality in microcomputer/other components" is "Yes/Unknown," a message "There is a possibility of faults. Please refer to a nearby store" is displayed on the display screen.

In the case of the three patterns on the first to third lines, that is, when an abnormality is not present in the microcomputer, there is no problem because the conventional fault diagnosis function can accurately detect the cause of abnormalities in the terminal device 100.

However, in the case of the pattern on the fourth line, that is, when an abnormality is present in the microcomputer, the conventional fault diagnosis function cannot detect whether the plug is plugged in or out and cannot accurately detect the cause of faults.

Thus, an object of the fault diagnosis system according to the present embodiment is to accurately detect the cause of faults even when an abnormality is present on the microcomputer as in the pattern on the fourth line. Hereinafter, the fault diagnosis system will be described in detail.

Figure 2:
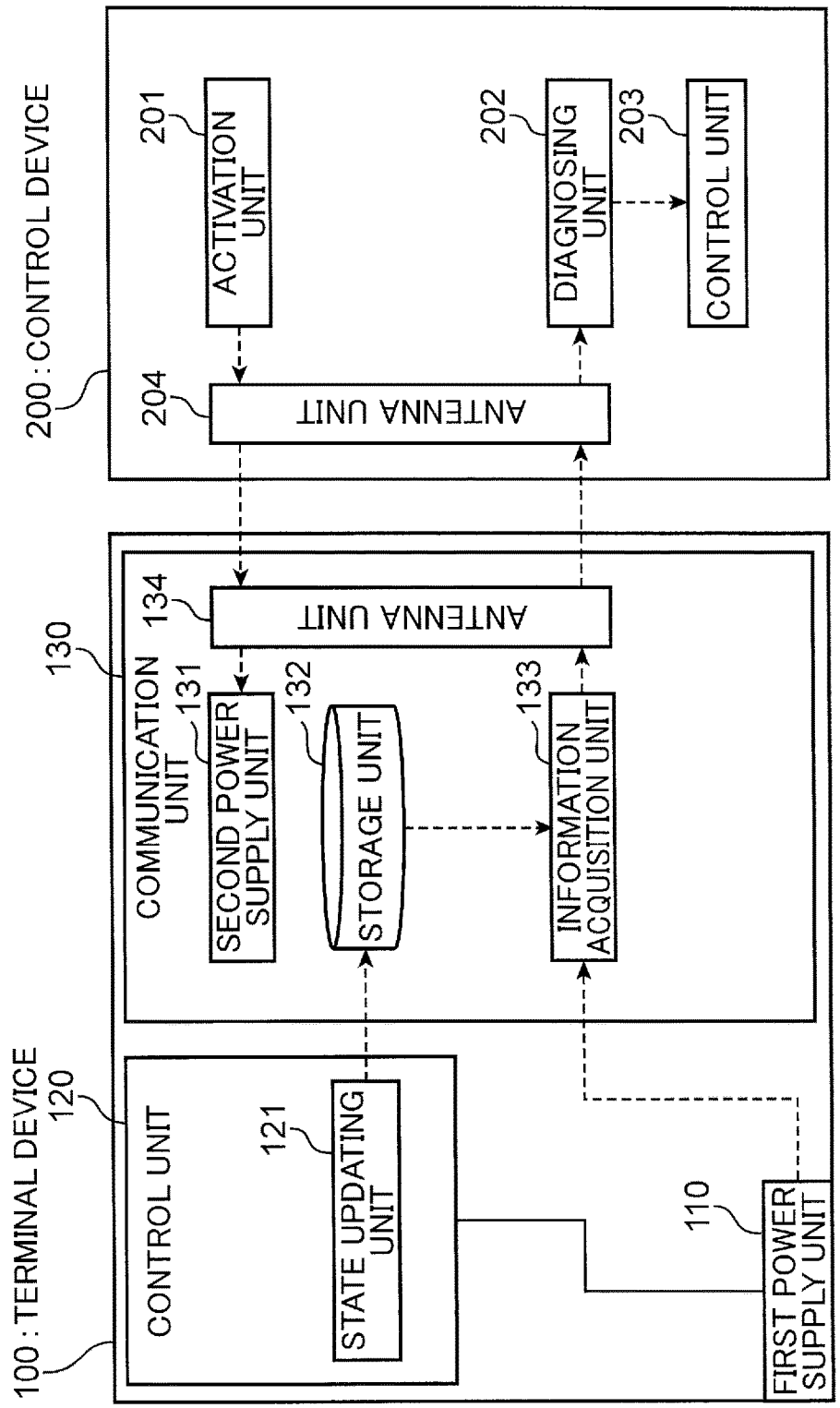
FIG. 2 is a block diagram of the fault diagnosis system according to the first embodiment of the present invention.

FIG. 2 is a block diagram of the fault diagnosis system according to the first embodiment of the present invention. The terminal device 100 includes a control unit 120, a first power supply unit 110, and a communication unit 130.

The first power supply unit 110 supplies electric power to the control unit 120. In the present embodiment, a power supply circuit that converts electric power supplied via a plug from a power company or a residential power generator into electric power ideal for driving the terminal device 100 is employed as the first power supply unit 110, for example. This is an example only, and when the terminal device 100 is a device that mounts a storage battery thereon, a battery may be employed as the first power supply unit 110. A lithium-ion battery, an electric double layer capacitor, a nickel-cadmium battery, or a nickel-hydrogen battery may be employed as the battery.

The control unit 120 is configured as a microcomputer (microcontroller) that controls the entire terminal device 100 in a centralized manner. The control unit 120 operates after receiving the supply of electric power from the first power supply unit 110 and includes a state updating unit 121. The state updating unit 121 monitors the state of the control unit 120. In the present embodiment, the state of the control unit 120 includes an active state and an idle state.

When the state of the control unit 120 transitions from the idle state to the active state, the state updating unit 121 updates first information stored in a storage unit 132 into the active state. When the state of the control unit 120 transitions from the active state to the idle state, the state updating unit 121 updates the first information stored in the storage unit 132 into the idle state.

Here, an example of the case where the state of the control unit 120 transitions from the idle state to the active state is a case where a user turns on the switch of the terminal device 100, and the supply of electric power from the first power supply unit 110 to the control unit 120 starts. Moreover, an example of the case where the state of the control unit 120 transitions from the active state to the idle state is a case where the user turns off the switch of the terminal device 100, or a case where if the terminal device 100 is a washing machine, washing of clothes ends.

The communication unit 130 is configured as a communication device that performs short-range wireless communication and includes a second power supply unit 131, the storage unit 132, an information acquiring unit 133, and an antenna unit 134. The second power supply unit 131 induces electric power from radio waves received by the antenna unit 134 and supplies the induced electric power to other blocks that constitute the communication unit 130. In the present embodiment, a polling signal is periodically transmitted from the control device 200, and the second power supply unit 131 induces electric power upon receiving the polling signal.

The storage unit 132 is configured as a nonvolatile memory that operates after receiving the supply of electric power from the second power supply unit 131, for example, and stores first information.

The information acquiring unit 133 operates after receiving the supply of electric power from the second power supply unit 131, acquire second information indicating whether electric power is supplied from the first power supply unit 110, acquires the first information from the storage unit 132, and transmits the acquired first and second information to the control device 200 via the antenna unit 134.

Here, the information acquiring unit 133 acquires the first and second information and transmits the information to the control device 200 when the supply of electric power from the second power supply unit 131 starts.

Figure 12:
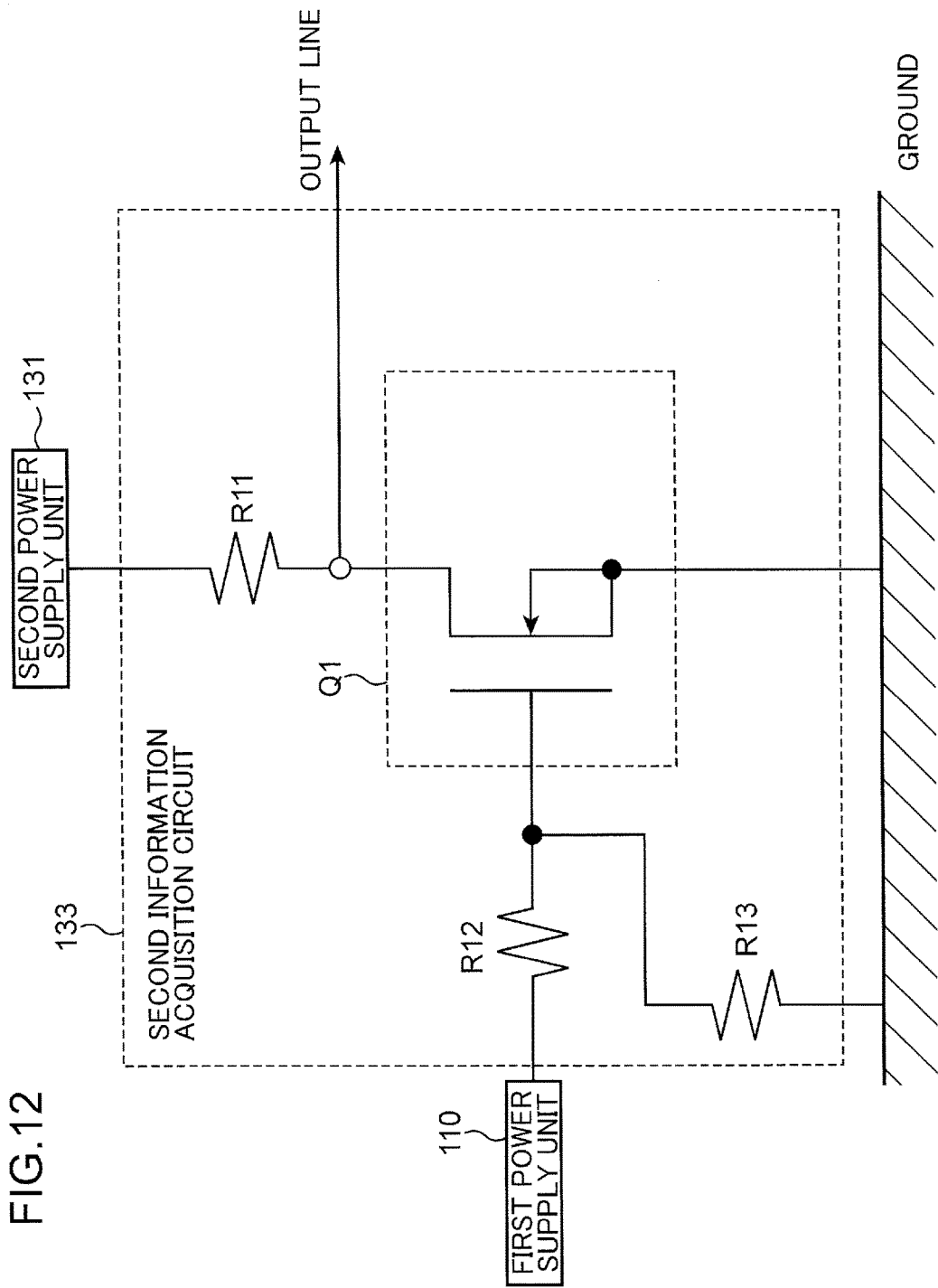
FIG. 12 shows an example of a circuit diagram of a second information acquisition circuit included in an information acquiring unit to acquire second information.

FIG. 12 shows an example of a circuit diagram of a second information acquisition circuit included in the information acquiring unit 133 to acquire the second information. As shown in FIG. 12, the second information acquisition circuit includes three resistors R11 to R13 and a transistor Q1. The transistor Q1 is configured as an n-channel MOS-FET, for example. The transistor Q1 has a gate connected to the first power supply unit 110 via the resistor R12 and connected to the ground via the resistor R13. The transistor Q1 has a drain connected to the second power supply unit 131 via the resistor R11. The transistor Q1 has a source connected to the ground.

When the first power supply unit 110 is supplying electric power, a high-level voltage is applied to the gate of the transistor Q1 and the transistor Q1 is turned on. As a result, when electric power is supplied from the second power supply unit 131, current flows between the source and drain of the transistor Q1, and a low-level voltage is output from an output line due to a voltage drop across the resistor R11. In this case, the information acquiring unit 133 determines that the first power supply unit 110 is in a state where power is supplied (hereinafter, a power-supply state) and generates second information indicating the power-supply state.

On the other hand, when the first power supply unit 110 is not supplying electric power, a low-level voltage is applied to the gate of the transistor Q1 and the transistor Q1 is turned off. As a result, even when electric power is supplied from the second power supply unit 131, no current flows between the source and drain of the transistor Q1, and a high-level voltage is output from the output line. In this case, the information acquiring unit 133 determines that the first power supply unit 110 is in a state where power is not supplied (hereinafter, a non-power-supply state) and generates second information indicating the non-power-supply state.

In this manner, when the voltage output from the first power supply unit 110 is equal to or larger than a predetermined value, the information acquiring unit 133 determines that the first power supply unit 110 is in the power-supply state and generates the second information indicating the power-supply state. On the other hand, when the voltage is smaller than the predetermined value, the information acquiring unit 133 determines that the first power supply unit 110 is in the non-power-supply state and generates the second information indicating the non-power-supply state. The second information acquisition circuit may be provided in the first power supply unit 110.

Returning to FIG. 2, the control device 200 includes an activation unit 201, a diagnosing unit 202, a control unit 203, and an antenna unit 204. The activation unit 201 is configured as a communication circuit capable of performing short-range wireless communication, for example, and periodically transmits a polling signal to the terminal device 100. Here, a period shorter than a period in which the user holds the control device 200 over the terminal device 100, for example, is employed as the cycle at which the polling signal is transmitted. Due to this, the control device 200 can transmit the polling signal to the terminal device 100 at least once during the period in which the user holds the control device 200 over the terminal device 100 and can perform short-range wireless communication.

Upon receiving the first and second information transmitted from the information acquiring unit 133 of the terminal device 100, the diagnosing unit 202 diagnoses a fault in the terminal device 100 based on the received first and second information.

FIG. 3 is a diagram showing an example of a fault diagnosis table 300 used when the diagnosing unit 202 diagnoses faults. The fault diagnosis table 300 includes first information field and second information field, and each cell stores a diagnosis result for each of four cases (Cases (a) to (d)) which are combinations of a case where the first information indicates the active state or the idle state and a case where the second information indicates the power-supply state or the non-power-supply state.

Thus, the diagnosing unit 202 diagnoses that the control unit 120 has a fault in a case (Case (d)) where the second information indicates the non-power-supply state and the first information indicates the active state or a case (Case (c)) where the second information indicates the power-supply state and the first information indicates the idle state. Moreover, the diagnosing unit 202 diagnoses that the control unit 120 is normal in a case (Case (a)) where the second information indicates the power-supply state and the first information indicates the active state or a case (Case (b)) where the second information indicates the non-power-supply state and the first information indicates the idle state.

In the case of Case (a), since the control unit 120 is in the active state after receiving the supply of electric power from the first power supply unit 110, the control unit 120 is operating normally. In this case, the diagnosing unit 202 outputs a diagnosis result indicating that the control unit 120 is normal (active).

In the case of Case (b), since the control unit 120 is in the idle state in response to the interruption of the supply of electric power from the first power supply unit 110, the control unit 120 is idling normally. In this case, the diagnosing unit 202 outputs a diagnosis result indicating that the control unit 120 is normal (idle).

In the case of Case (c), since the control unit 120 is in the idle state even when electric power is supplied from the first power supply unit 110, the control unit 120 has a fault. In this case, the diagnosing unit 202 outputs a diagnosis result indicating that the control unit 120 has a fault and the plug is plugged in.

In the case of Case (d), since the control unit 120 is in the active state even when electric power is not supplied from the first power supply unit 110, the control unit 120 has a fault. In this case, the diagnosing unit 202 outputs a diagnosis result indicating that the control unit 120 has a fault and the plug is plugged off.

The control unit 203 displays the diagnosis results of the diagnosing unit 202 on the display panel, for example, to inform the user of the diagnosis results for the terminal device 100. Specifically, when the diagnosing unit 202 outputs the diagnosis result of Case (a), the control unit 203 displays a display screen including a message "Normal," for example, on the display panel. Moreover, when the diagnosing unit 202 outputs the diagnosis result of Case (b), the control unit 203 displays a display screen including a message "Power is not turned on." or "Plug is plugged off," for example, on the display panel. Further, when the diagnosing unit 202 outputs the diagnosis result of Case (c), the control unit 203 displays a display screen including a message "Microcomputer has a fault," for example, on the display panel. Further, when the diagnosing unit 202 outputs the diagnosis result of Case (d), the control unit 203 displays a display screen including a message "Microcomputer has a fault. Power is not turned on" or "Microcomputer has a fault. Plug is plugged off," for example, on the display panel.

Next, the operation of the fault diagnosis system shown in FIG. 2 will be described. First, upon receiving a polling signal transmitted from the activation unit 201, the second power supply unit 131 induces electric power. Subsequently, the information acquiring unit 133 operates after receiving the supply of electric power from the second power supply unit 131, acquires second information indicating whether electric power is supplied from the first power supply unit 110, and acquires first information from the storage unit 132.

Subsequently, the information acquiring unit 133 transmits the acquired first and second information to the control device 200 via the antenna unit 134. Subsequently, the diagnosing unit 202 receives the first and second information via the antenna unit 204 and outputs diagnosis results for the terminal device 100 using the received first and second information and the fault diagnosis table 300. Subsequently, the control unit 203 displays the diagnosis results of the diagnosing unit 202 on the display panel to inform the user of the diagnosis results.

As described above, according to the fault diagnosis system of the present embodiment, the terminal device 100 includes the storage unit 132 that stores first information indicating the state of the control unit 120, the second power supply unit 131 that induces electric power according to a polling signal from the control device 200, and the information acquiring unit 133 that operates after receiving the supply of electric power from the second power supply unit 131 and acquires the first and second information to transmit the information to the control device 200.

Thus, when the control device 200 is held over the terminal device 100, the terminal device 100 can transmit the first and second information to the control device 200 via short-range wireless communication regardless of whether electric power is supplied from the first power supply unit 110.

As a result, the control device 200 can acquire the first and second information from the terminal device 100 regardless of whether the terminal device 100 is turned on or off. Moreover, the first information indicates the present state of the control unit 120 and the second information indicates whether electric power is supplied from the first power supply unit 110. Thus, even when the control unit 120 has a fault, the control device 200 can diagnose whether electric power is supplied from the first power supply unit 110 from a combination these items of information, diagnose whether the plug of the terminal device 100 is plugged off, and accurately detect the cause of faults in the terminal device 100.

(Second Embodiment)

Figure 4:
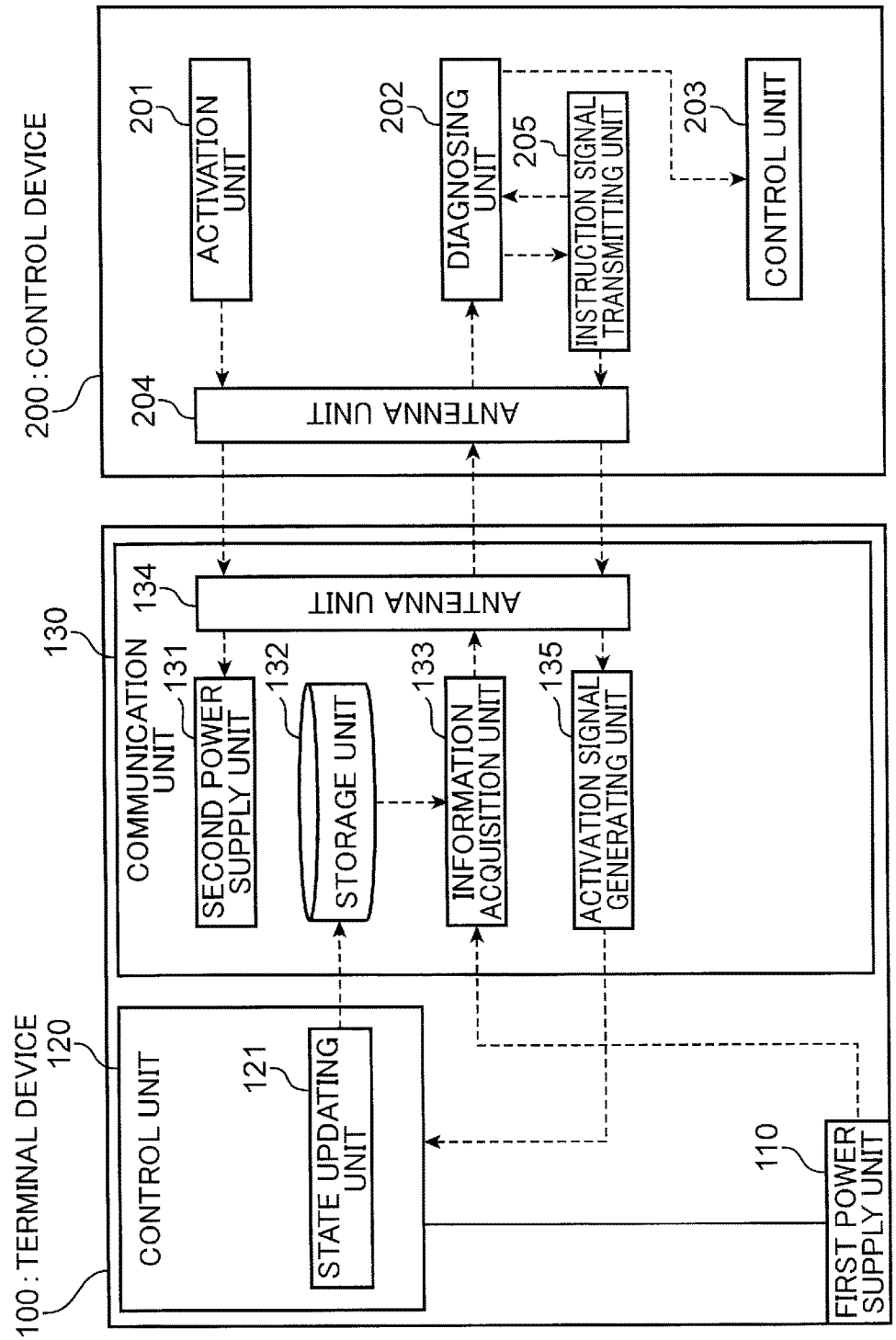
FIG. 4 is a block diagram of a fault diagnosis system according to a second embodiment of the present invention.

A fault diagnosis system according to a second embodiment is configured such that, when the diagnosing unit 202 of the control device 200 outputs the diagnosis result of Case (c), it is tried to activate the control unit 120 to distinguish a case where the control unit 120 actually has a fault from a case where the control unit 120 is just in the sleep state. FIG. 4 is a block diagram of the fault diagnosis system according to the second embodiment. In the present embodiment, description of the same configuration as the first embodiment will not be provided.

In the first embodiment, it was described that the state of the control unit 120 includes the two states of the active state and the idle state. However, a microcomputer may also be in a sleep state in addition to these two states. The sleep state is a mode where the microcomputer is supplied with electric power but is not performing any operation, and for example, is a mode where the microcomputer returns to the active state according to an instruction from the user.

A configuration in which, when the state of the control unit 120 is the sleep state, the state updating unit 121 updates the first information into the idle state may be employed. In this case, in Case (c), it is difficult to distinguish a case where the first information indicates the idle state because the control unit 120 has a fault from a case where the first information indicates the idle state because the control unit 120 is in the sleep state. Thus, there is a problem in that it is diagnosed that the control unit 120 has a fault even when the control unit 120 does not have a fault. That is, in a case where the control unit 120 is in the sleep state and the first power supply unit 110 is supplying electric power, since the first information indicates the idle state and the second information indicates the power-supply state, it is diagnosed that the control unit 120 corresponds to Case (c) of the fault diagnosis table 300, and that the control unit 120 has a fault even when the control unit 120 is in the sleep state.

Therefore, in the second embodiment, when the diagnosis result of Case (c) is obtained, it is tried to activate the control unit 120 in order to distinguish a case where the control unit 120 actually has a fault from a case where the control unit 120 is just in the sleep state. Moreover, when the first information changes to the active state, since the diagnosis result of Case (a) is obtained, it is diagnosed that the control unit 120 is normal. On the other hand, when the first information does not change to the active state but remains in the idle state, since the diagnosis result of Case (c) is obtained again, it is diagnosed that the control unit 120 has a fault.

In the fault diagnosis system of the second embodiment, an activation signal generating unit 135 is provided in the control device 200, and an instruction signal transmitting unit 205 is provided in the control device 200.

When the diagnosis result of Case (c) is obtained as the result of the fault diagnosis of the diagnosing unit 202 performed based on the first and second information, the instruction signal transmitting unit 205 transmits an instruction signal for putting the control unit 120 into the active state to the terminal device 100 via the antenna unit 204 by determining that there is a possibility of faults in the control unit 120.

Upon receiving the instruction signal, the activation signal generating unit 135 generates an activation signal for putting the control unit 120 into the active state and transmits the activation signal to the control unit 120. Here, the activation signal generating unit 135 operates after receiving the supply of the electric power from the second power supply unit 131, induced according to the instruction signal and transmits the activation signal to the control unit 120.

Upon receiving the activation signal, the control unit 120 transitions to the active state if it was in the sleep state. As a result, the state updating unit 121 updates the first information stored in the storage unit 132 into the active state. On the other hand, when the control unit 120 has a fault, since the control unit 120 cannot be activated even when the activation signal is received, the first information maintains the idle state.

When the control unit 120 transitions from the active state to the sleep state, the state updating unit 121 updates the first information into the idle state. Moreover, when the control unit 120 transitions from the sleep state to the active state, the state updating unit 121 updates the first information into the active state. Further, even when the control unit 120 transitions from the sleep state to the idle state or from the idle state to the sleep state, the state updating unit 121 maintains the first information in the idle state.

When a predetermined period has elapsed after the activation signal generating unit 135 transmitted the activation signal, the information acquiring unit 133 acquires the first information from the storage unit 132, acquires the second information from the output voltage of the first power supply unit 110, and transmits the acquired information to the control device 200 via the antenna unit 134. Here, a period slightly longer than the time elapsed until the first information is updated by the state updating unit 121 after the activation signal generating unit 135 transmits the activation signal to the control unit 120, for example, is employed as the predetermined period. In this manner, the information acquiring unit 133 can acquire the first information after it was updated.

When the first and second information is transmitted from the information acquiring unit 133 in response to the instruction signal transmitted from the instruction signal transmitting unit 205, the diagnosing unit 202 diagnoses faults using the first and second information and the fault diagnosis table 300.

Next, the operation of the fault diagnosis system according to the second embodiment will be described. The operations performed until the terminal device 100 receives the polling signal transmitted from the activation unit 201 and transmits the first and second information to the control device 200, and the diagnosing unit 202 diagnoses faults using the first and second information and the fault diagnosis table 300 are the same as those of the first embodiment.

In this example, it is assumed that the diagnosing unit 202 outputs the diagnosis result of Case (c) because the first information indicates the idle state and the second information indicates the power-supply state. The diagnosing unit 202 instructs the instruction signal transmitting unit 205 to transmit an instruction signal. Subsequently, the instruction signal transmitting unit 205 transmits the instruction signal to the terminal device 100 via the antenna unit 204. Subsequently, the activation signal generating unit 135 receives the instruction signal and transmits an activation signal to the control unit 120. Subsequently, the control unit 120 is activated according to the activation signal if the control unit 120 does not have a fault and is not activated according to the activation signal if the control unit 120 has a fault.

Subsequently, when the control unit 120 transitions from the sleep state to the active state, the state updating unit 121 updates the first information stored in the storage unit 132 into the active state. Subsequently, the information acquiring unit 133 transmits the first and second information. Subsequently, when the first information indicates the active state and the second information indicates the power-supply state, the diagnosing unit 202 diagnoses that the control unit 120 corresponds to Case (a) and thus is normal. In this case, the control unit 203 may display a display screen including a message "Normal" on the display panel.

On the other hand, in a case where the first information indicates the idle state and the second information indicates the power-supply state, the diagnosing unit 202 diagnoses that the control unit 120 corresponds to Case (c) and thus has a fault. In this case, the control unit 203 may display a display screen including a message "Microcomputer has a fault," for example, on the display panel.

That is, in the present embodiment, the control unit 203 displays the second diagnosis result of the diagnosing unit 202 on the display panel rather than immediately displaying the first diagnosis result of the diagnosing unit 202 on the display panel when the first diagnosis result is Case (c). By doing so, a situation in which the user is informed that the control unit 120 has a fault even when the control unit 120 is in the sleep state can be prevented.

As described above, according to the fault diagnosis system of the second embodiment, when the diagnosing unit 202 outputs the diagnosis result of Case (c), it is tried to activate the control unit 120 and it is diagnosed that the control unit 120 is in the sleep state and in a normal condition if the control unit 120 is activated and that the control unit 120 has a fault if the control unit 120 is not activated. Thus, it is possible to prevent a situation in which it is diagnosed that the control unit 120 has a fault even when the control unit 120 is in the sleep state.

(Third Embodiment)

Figure 5:
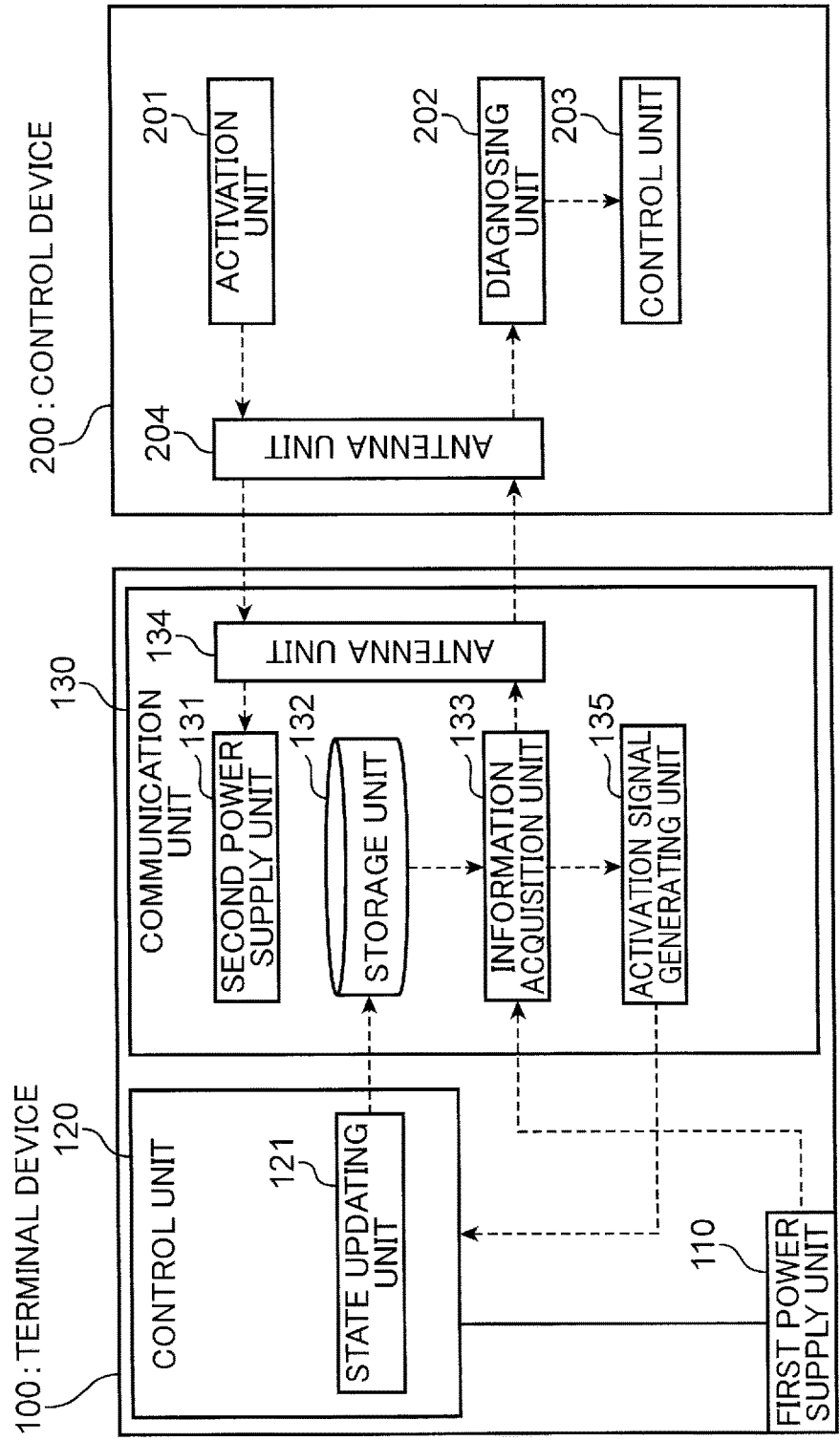
FIG. 5 is a block diagram of a fault diagnosis system according to a third embodiment of the present invention.

A fault diagnosis system according to a third embodiment has a configuration in which, when the information acquiring unit 133 acquires the second information indicating the power-supply state, a situation is prevented from occurring in which it is diagnosed that the control unit 120 has a fault even when the control unit 120 is in the sleep state after trying activating the control unit 120. FIG. 5 is a block diagram of the fault diagnosis system according to the third embodiment of the present invention. In the present embodiment, description of the same configuration as the first and second embodiments will not be provided.

As described in the second embodiment, since the first information indicates the idle state when the control unit 120 is in the sleep state, it is diagnosed that the control unit 120 corresponds to Case (c) and has a fault when the second information indicates the power-supply state.

In order to prevent this, in the present embodiment, when the information acquiring unit 133 acquires the second information indicating the power-supply state, the activation signal generating unit 135 transmits an activation signal to the control unit 120 to activate the control unit 120. As a result if the control unit 120 is in the sleep state, the control unit 120 transitions to the active state, and the first information is updated from the idle state into the active state and is transmitted to the control device 200. On the other hand, if the control unit 120 has a fault, the first information is not updated, and the first information indicating the idle state is transmitted to the control device 200.

As a result, it is possible to prevent the diagnosing unit 202 from diagnosing that the control unit 120 has a fault even when the control unit 120 is in the sleep state.

In the fault diagnosis system of the third embodiment, the instruction signal transmitting unit 205 is omitted from the control device 200.

When the information acquiring unit 133 acquires the second information indicating the power-supply state, the activation signal generating unit 135 generates an activation signal for activating the control unit 120 and transmits the activation signal to the control unit 120. Here, the activation signal generating unit 135 operates after receiving the supply of electric power from the second power supply unit 131, induced according to the polling signal and transmits the activation signal to the control unit 120.

Upon receiving the activation signal, the control unit 120 transitions to the active state if it was in the sleep state. As a result, the state updating unit 121 updates the first information stored in the storage unit 132 into the active state. On the other hand, when the control unit 120 has a fault, since the control unit 120 cannot be activated even when the activation signal is received, the first information maintains the idle state.

When a predetermined period has elapsed after the activation signal generating unit 135 transmitted the activation signal, the information acquiring unit 133 acquires the first information from the storage unit 132, acquires the second information from the output voltage of the first power supply unit 110, and transmits the acquired information to the control device 200 via the antenna unit 134.

Next, the operation of the fault diagnosis system according to the third embodiment will be described. The terminal device 100 receives a polling signal transmitted from the activation unit 201. Subsequently, the information acquiring unit 133 acquires the first information from the storage unit 132 and acquires the second information from the output voltage of the first power supply unit 110.

In this example, it is assumed that the second information indicates the power-supply state. In this case, the information acquiring unit 133 instructs the activation signal generating unit 135 to generate an activation signal. Subsequently, the activation signal generating unit 135 generates the activation signal and transmits the activation signal to the control unit 120.

Subsequently, the control unit 120 is activated according to the activation signal if the control unit 120 does not have a fault and is not activated according to the activation signal if the control unit 120 has a fault.

Subsequently, when the control unit 120 transitions from the sleep state to the active state, the state updating unit 121 updates the first information stored in the storage unit 132 into the active state. Subsequently, the information acquiring unit 133 acquires the first information from the storage unit 132, acquires the second information from the output voltage of the first power supply unit 110, and transmits the information to the control device 200.

Subsequently, the diagnosing unit 202 receives the first and second information and diagnoses faults in the terminal device 100 using the first and second information and the fault diagnosis table 300 similarly to the first embodiment. Subsequently, the control unit 203 displays the diagnosis result of the diagnosing unit 202 on the display panel.

As described above, according to the fault diagnosis system of the third embodiment, when the information acquiring unit 133 acquires the first information indicating the power-supply state, it is tried to activate the control unit 120, and it is diagnosed that the control unit 120 is normal when the control unit 120 is activated and that the control unit 120 has a fault when the control unit 120 is not activated. Thus, it is possible to prevent a situation in which it is diagnosed that the control unit 120 has a fault even when the control unit 120 is in the sleep state.

(Fourth Embodiment)

Figure 6:
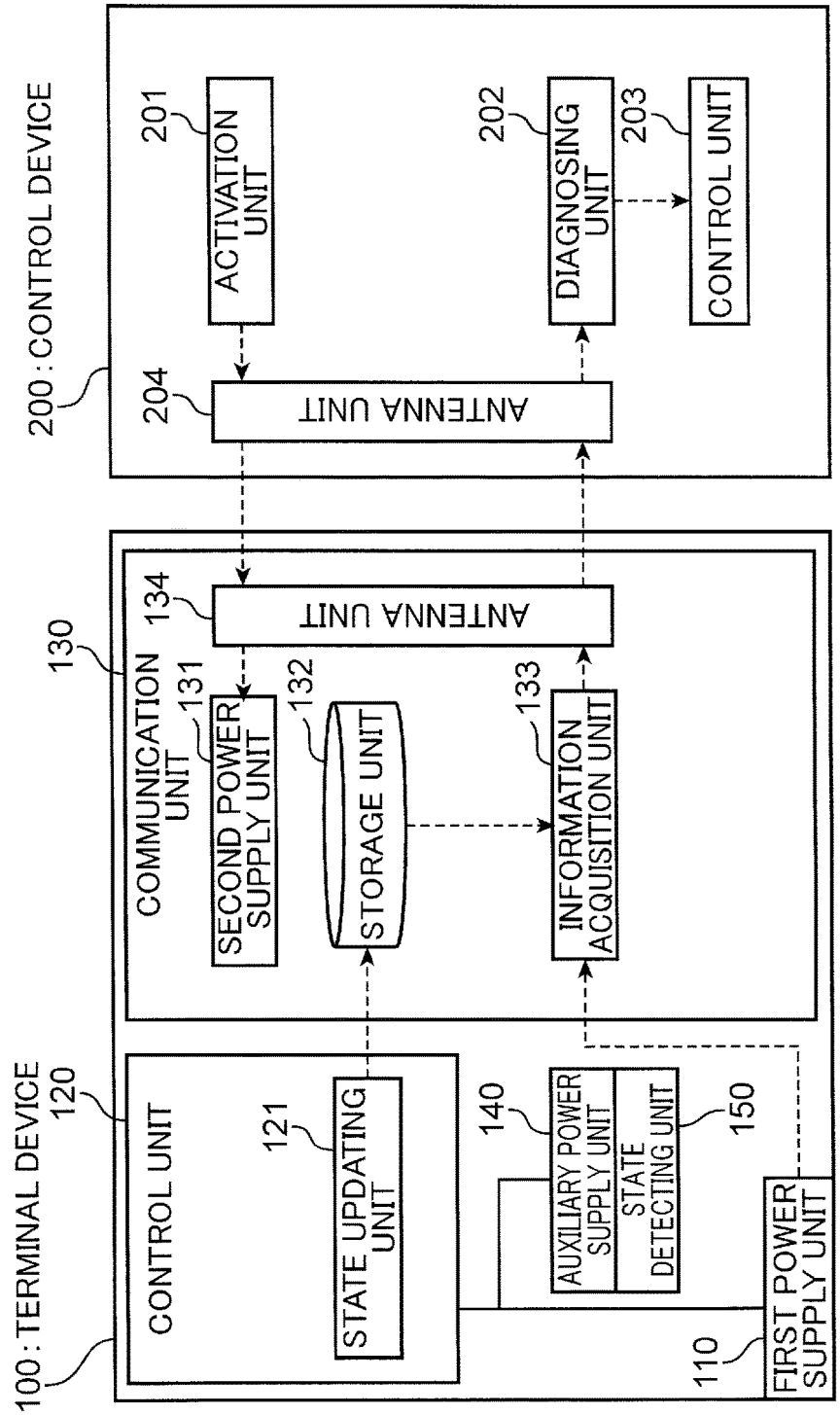
FIG. 6 is a block diagram of a fault diagnosis system according to a fourth embodiment of the present invention.

FIG. 6 is a block diagram of a fault diagnosis system according to a fourth embodiment of the present invention. The fault diagnosis system according to the fourth embodiment has a configuration in which an auxiliary power supply unit 140 that supplies electric power for allowing the state updating unit 121 to update the first information to the control unit 120 and the storage unit 132 when the supply of electric power from the first power supply unit 110 is interrupted is provided in the terminal device 100. In the present embodiment, description of the same configuration as the first to third embodiments will not be provided.

A case in which the plug of the terminal device 100 is unexpectedly plugged off or the supply of electric power from the first power supply unit 110 is unexpectedly interrupted due to contact errors of a power switch may happen. In this case, there is a problem in that the state updating unit 121 may be unable to update the first information from the active state to the idle state. Further, in this case, since the first information indicating the active state and the second information indicating the non-power-supply state are transmitted to the control device 200, there is a possibility that the diagnosing unit 202 diagnoses that the control unit 120 corresponds to Case (d) of the fault diagnosis table 300 and has a fault even when the control unit 120 does not have a fault.

Therefore, in the present embodiment, the auxiliary power supply unit 140 is provided so that necessary electric power is supplied from the auxiliary power supply unit 140 when the supply of electric power from the first power supply unit 110 is interrupted, and that the state updating unit 121 can reliably update the first information. Specifically, the terminal device 100 includes the auxiliary power supply unit 140 and a state detecting unit 150. The other configuration is the same as that of FIG. 2.

The state detecting unit 150 detects whether the supply of electric power from the first power supply unit 110 has been interrupted. Here, when the output voltage of the first power supply unit 110 is equal to or smaller than a predetermined value or 0 V, the state detecting unit 150 determines that the supply of electric power from the first power supply unit is interrupted, supplies electric power from the auxiliary power supply unit 140 to the state updating unit 121 and the storage unit 132 to allow the state updating unit 121 to update the first information. The state detecting unit 150 can operate using the electric power from the auxiliary power supply unit 140 even when the supply of electric power from the first power supply unit 110 is interrupted.

The auxiliary power supply unit 140 is configured as storage battery means such as a capacitor, a battery, or a storage battery, for example. Here, the auxiliary power supply unit 140 may have a capacity capable of storing electric power that allows the state updating unit 121 to update the first information stored in the storage unit 132 at least once even when no electric power is supplied from the first power supply unit 110, for example.

Next, the operation of the fault diagnosis system according to the fourth embodiment will be described. First, it is assumed that the plug is plugged off by the user so that the supply of electric power from the first power supply unit 110 is unexpectedly interrupted. Then, the state detecting unit 150 detects this and supplies the electric power of the auxiliary power supply unit 140 to the state updating unit 121 and the storage unit 132. Subsequently, the state updating unit 121 updates the first information stored in the storage unit 132 from the active state to the idle state.

As a result, when the polling signal transmitted from the control device 200 is received by the terminal device 100, the first information acquired by the information acquiring unit 133 indicates the idle state. Thus, the diagnosing unit 202 can diagnosis that the control unit 120 is normally idle (that is, the control unit 120 corresponds to Case (b)) because the first information indicates the idle state and the second information indicates the non-power-supply state.

As a result, it is possible to prevent a situation in which the supply of electric power from the first power supply unit 110 is unexpectedly interrupted so that the first information is not updated from the active state into the idle state, and the terminal device 100 stops operating. In this way, it is possible to prevent a situation in which, even when the control unit 120 does not have a fault, the diagnosing unit 202 diagnoses that the control unit 120 corresponds to Case (d) and has a fault.

(Fifth Embodiment)

Figure 7:
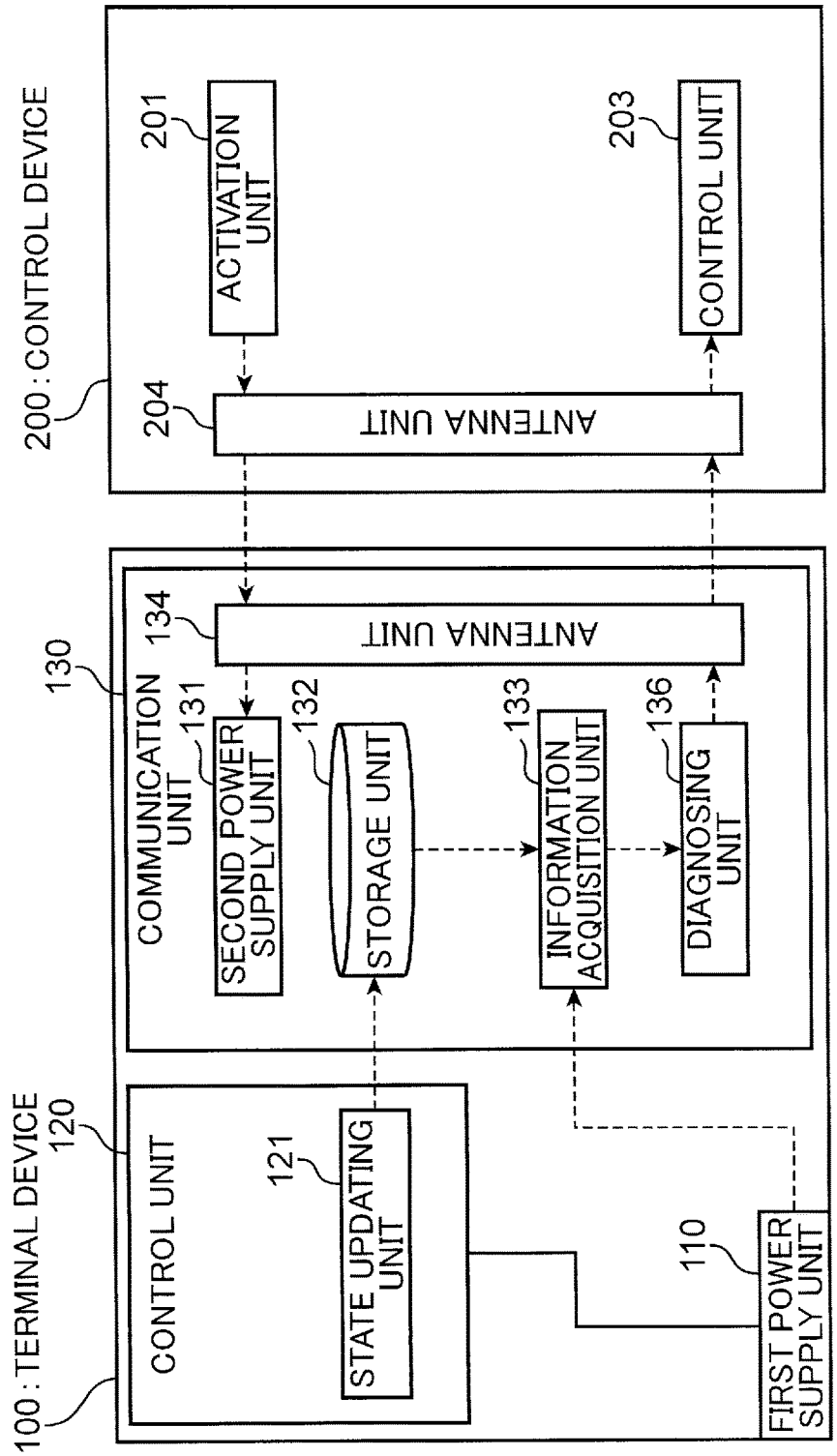
FIG. 7 is a block diagram of a fault diagnosis system according to a fifth embodiment of the present invention.

FIG. 7 is a block diagram of a fault diagnosis system according to a fifth embodiment of the present invention. In the fifth embodiment, description of the same configuration as the first to fourth embodiments will not be provided. The fault diagnosis system of the fifth embodiment has a configuration in which the fault diagnosis process performed by the control device 200 in the first embodiment is performed by the terminal device 100. Thus, in the fifth embodiment, as shown in FIG. 7, the diagnosing unit 202 provided in the control device 200 is omitted, and a diagnosing unit 136 is provided in the communication unit 130 of the terminal device 100.

The diagnosing unit 136 operates after receiving the supply of electric power from the second power supply unit 131, inducted according to the polling signal transmitted from the control device 200, acquires the first information from the storage unit 132, acquires the second information from the output voltage of the first power supply unit 110, and diagnoses faults in the terminal device 100 using the first and second information and the fault diagnosis table 300 similarly to the diagnosing unit 202 of the first embodiment. Moreover, the diagnosing unit 136 transmits the diagnosis results to the control device 200 via the antenna unit 134.

The control unit 203 receives the diagnosis results transmitted from the diagnosing unit 136 via the antenna unit 204, displays the diagnosis results on the display panel, and informs the user of the diagnosis results. A method of informing of the diagnosis results is the same as that of the first embodiment, and description thereof will not be provided.

In this manner, in the fault diagnosis system according to the fifth embodiment, since the diagnosing unit 136 is provided in the terminal device 100, the terminal device 100 itself can diagnosis faults and notify the control device 200 of the diagnosis results. Moreover, since the diagnosing unit 136 diagnoses faults in the terminal device 100 using the first and second information and the fault diagnosis table 300 similarly to the first embodiment, the same advantages as the first embodiment can be obtained.

(Sixth Embodiment)

Figure 8:
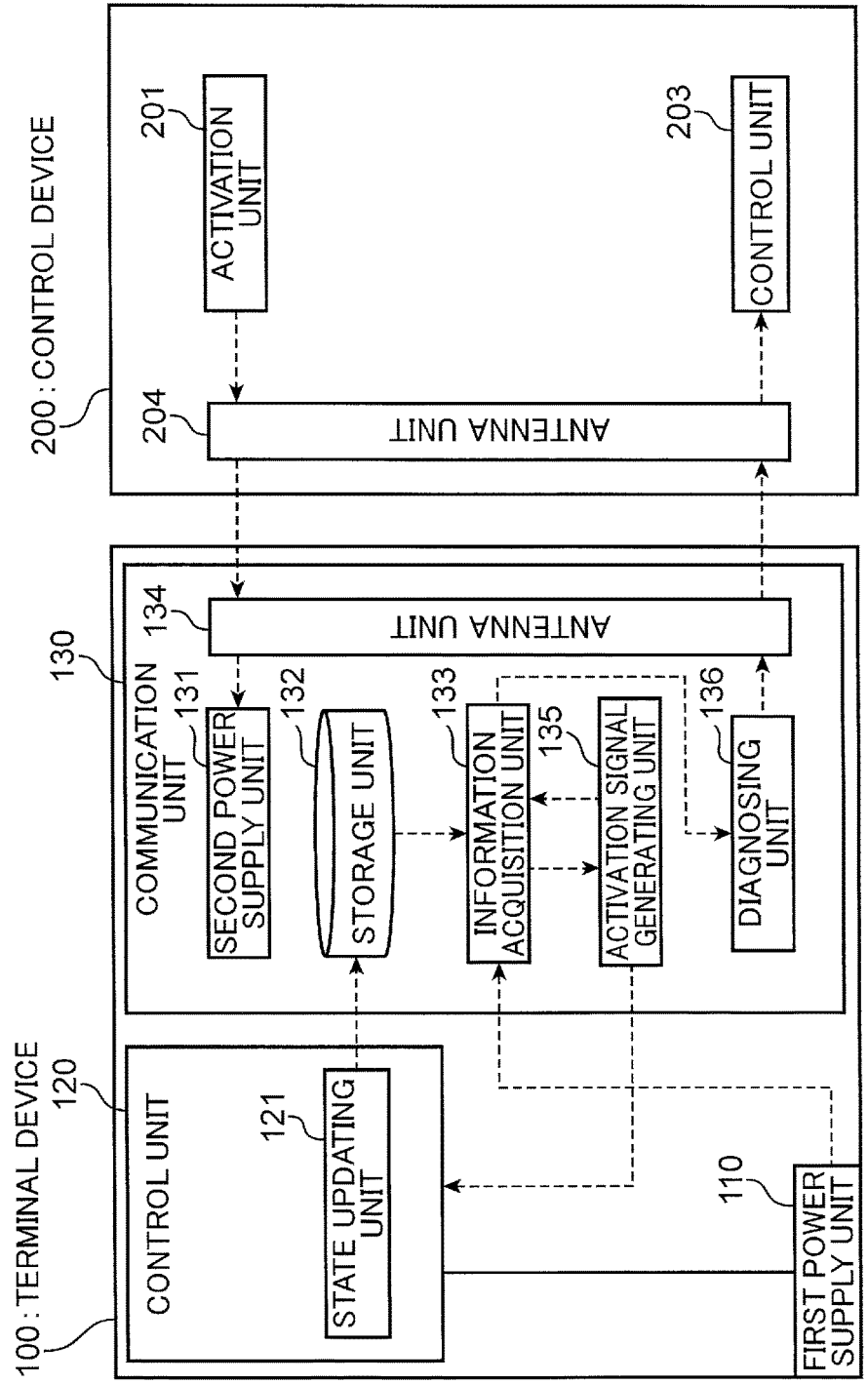
FIG. 8 is a block diagram of a fault diagnosis system according to a sixth embodiment of the present invention.

FIG. 8 is a block diagram of a fault diagnosis system according to a sixth embodiment of the present invention. In the sixth embodiment, description of the same configuration as the first to fifth embodiments will not be provided. The fault diagnosis system of the sixth embodiment has a configuration in which the fault diagnosis process performed by the control device 200 in the third embodiment is performed by the terminal device 100. Thus, in the sixth embodiment, as shown in FIG. 8, the diagnosing unit 202 provided in the control device 200 is omitted, and a diagnosing unit 136 is provided in the communication unit 130 of the terminal device 100.

In the present embodiment, similarly to the third embodiment, when the information acquiring unit 133 acquires the second information indicating the power-supply state, the activation signal generating unit 135 generates an activation signal for activating the control unit 120 and transmits the activation signal to the control unit 120.

Similarly to the third embodiment, when a predetermined period has elapsed after the activation signal generating unit 135 transmitted the activation signal, the information acquiring unit 133 acquires the first information from the storage unit 132, acquires the second information from the output voltage of the first power supply unit 110, and transmits the acquired information to the diagnosing unit 136.

Similarly to the third embodiment, the diagnosing unit 136 diagnoses faults in the terminal device 100 using the first and second information transmitted from the information acquiring unit 133 and the fault diagnosis table 300.

As described above, according to the fault diagnosis system of the sixth embodiment, even when the diagnosing unit 136 is provided in the terminal device 100, it is possible to prevent a situation in which it is diagnosed that the control unit 120 has a fault even when the control unit 120 is in the sleep state similarly to the third embodiment.

(Seventh Embodiment)

Figure 9:
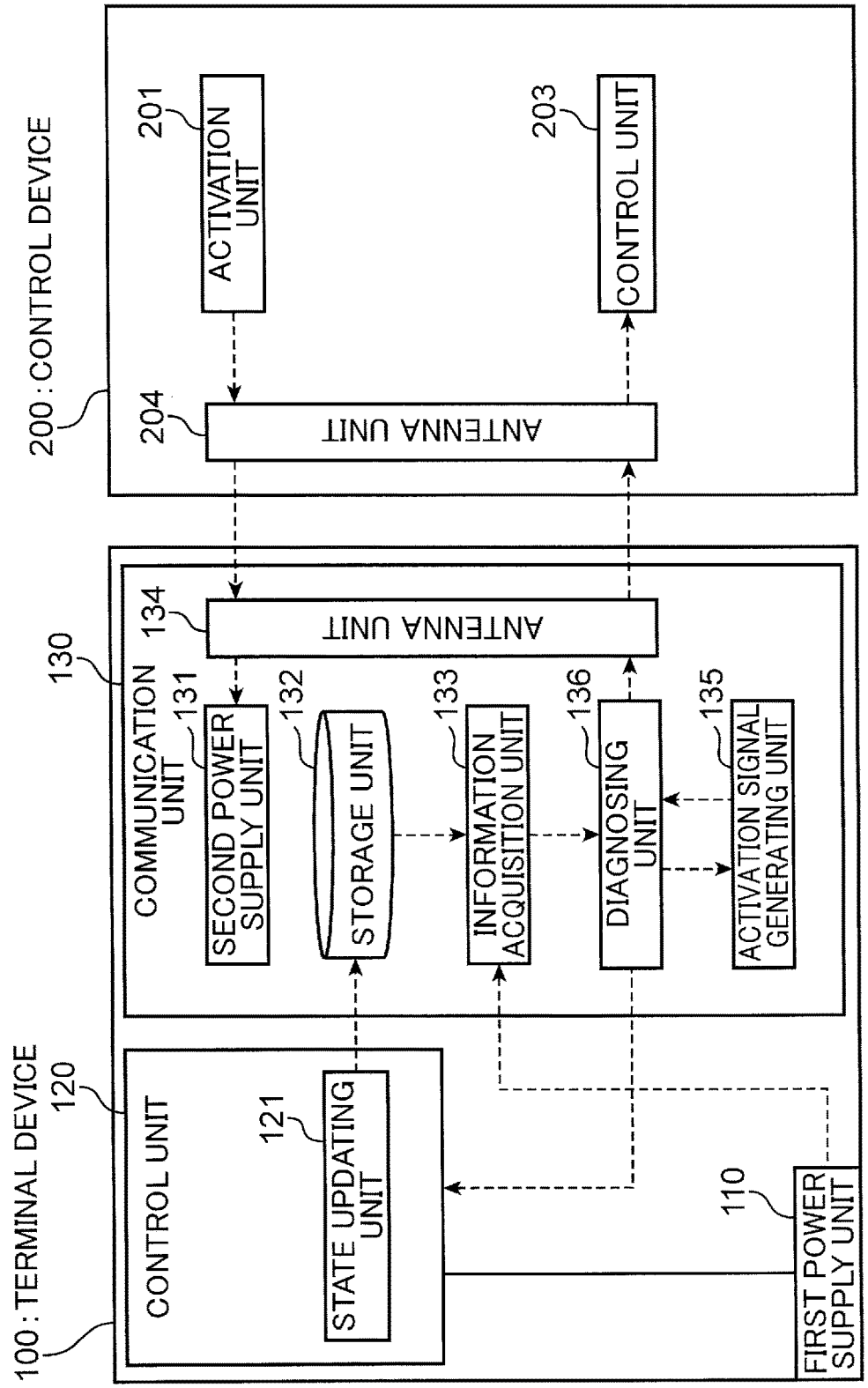
FIG. 9 is a block diagram of a fault diagnosis system according to a seventh embodiment of the present invention.

FIG. 9 is a block diagram of a fault diagnosis system according to a seventh embodiment of the present invention. In the seventh embodiment, description of the same configuration as the first to sixth embodiments will not be provided. The fault diagnosis system of the seventh embodiment has a configuration in which the fault diagnosis process performed by the control device 200 in the second embodiment is performed by the terminal device 100. Thus, in the seventh embodiment, as shown in FIG. 9, the diagnosing unit 202 and the instruction signal transmitting unit 205 provided in the control device 200 are omitted, and a diagnosing unit 136 is provided in the communication unit 130 of the terminal device 100.

In the present embodiment, when the diagnosis result of Case (c) is obtained as the result of the fault diagnosis of the diagnosing unit 136 performed based on the first and second information, the activation signal generating unit 135 transmits an activation signal for putting the control unit 120 into the active state to the control unit 120.

Similarly to the second embodiment, when a predetermined period has elapsed after the activation signal generating unit 135 transmitted the activation signal, the information acquiring unit 133 acquires the first information from the storage unit 132, acquires the second information from the output voltage of the first power supply unit 110, and transmits the acquired information to the diagnosing unit 136.

The diagnosing unit 136 diagnoses faults in the terminal device 100 using the first and second information transmitted from the information acquiring unit 133 and the fault diagnosis table 300 and transmits the diagnosis results to the control device 200 via the antenna unit 134.

As described above, according to the fault diagnosis system of the seventh embodiment, even when the diagnosing unit 136 is provided in the terminal device 100, it is possible to prevent a situation in which it is diagnosed that the control unit 120 has a fault even when the control unit 120 is in the sleep state similarly to the second embodiment.

(Eighth Embodiment)

Figure 10:
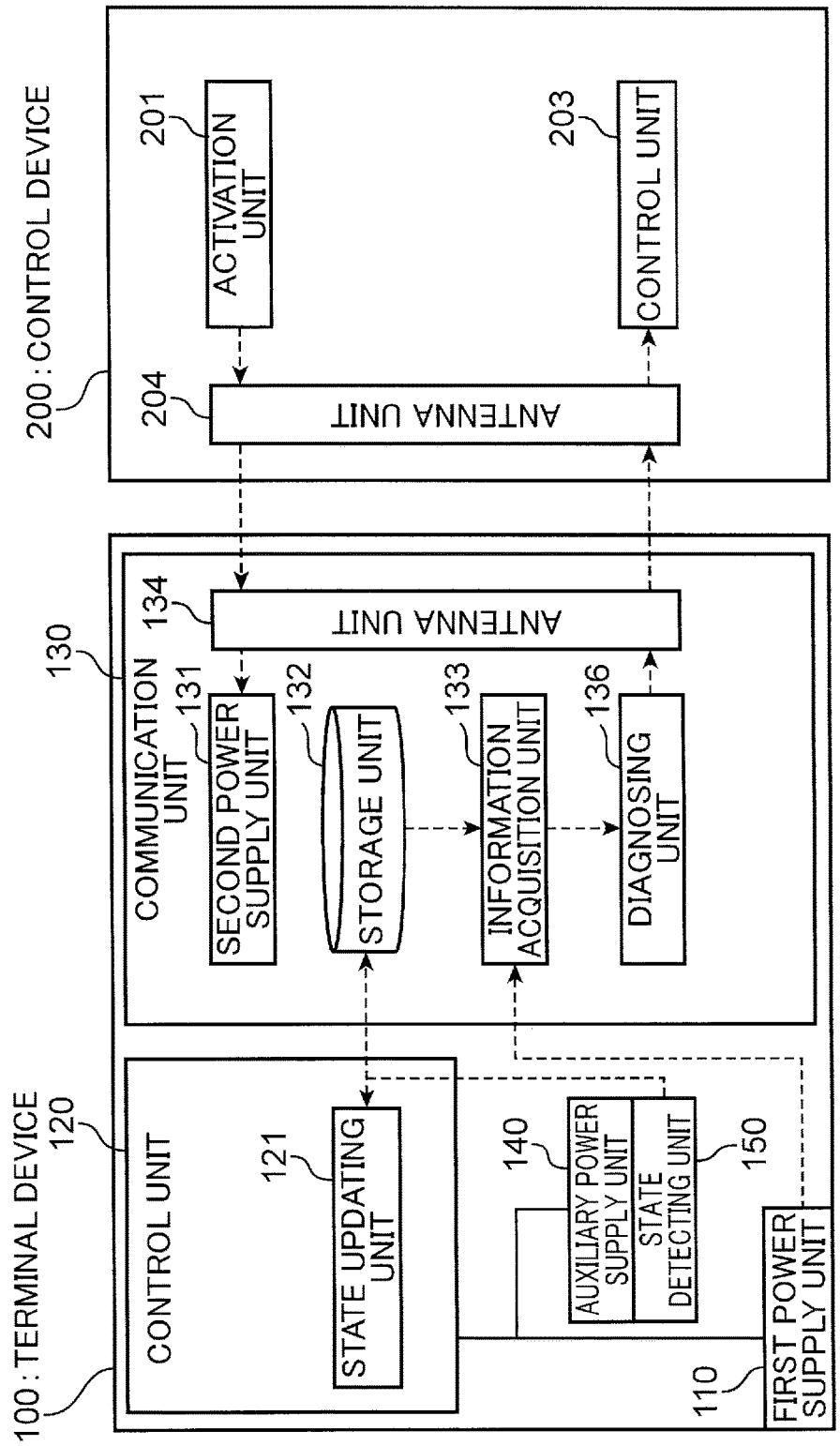
FIG. 10 is a block diagram of a fault diagnosis system according to an eighth embodiment of the present invention.

FIG. 10 is a block diagram of a fault diagnosis system according to an eighth embodiment of the present invention. In the eighth embodiment, description of the same configuration as the first to seventh embodiments will not be provided. The fault diagnosis system of the eighth embodiment has a configuration in which the fault diagnosis process performed by the control device 200 in the fourth embodiment is performed by the terminal device 100. Thus, in the eighth embodiment, as shown in FIG. 10, the diagnosing unit 202 provided in the control device 200 is omitted, and a diagnosing unit 136 is provided in the communication unit 130 of the terminal device 100.

The fault diagnosis system of the eighth embodiment has a configuration in which the auxiliary power supply unit 140 and the state detecting unit 150 are provided in the terminal device 100 similarly to the fourth embodiment. Thus, when the plug is plugged off by the user so that the supply of electric power from the first power supply unit 110 is unexpectedly interrupted, the state updating unit 121 updates the first information stored in the storage unit 132 into the idle state.

As a result, when the polling signal transmitted from the control device 200 is received by the terminal device 100, the first information acquired by the information acquiring unit 133 indicates the idle state. Thus, the diagnosing unit 136 can diagnosis that the control unit 120 is normally idle (that is, the control unit 120 corresponds to Case (b)) because the first information indicates the idle state and the second information indicates the non-power-supply state. As a result, it is possible to prevent a situation in which the supply of electric power from the first power supply unit 110 is unexpectedly interrupted so that the first information is not updated from the active state into the idle state, and it is diagnosed that the control unit 120 corresponds to Case (d). Moreover, it is possible to prevent a situation in which it is diagnosed that the control unit 120 has a fault even when the control unit 120 does not have a fault.

(Ninth Embodiment)

Figure 11:
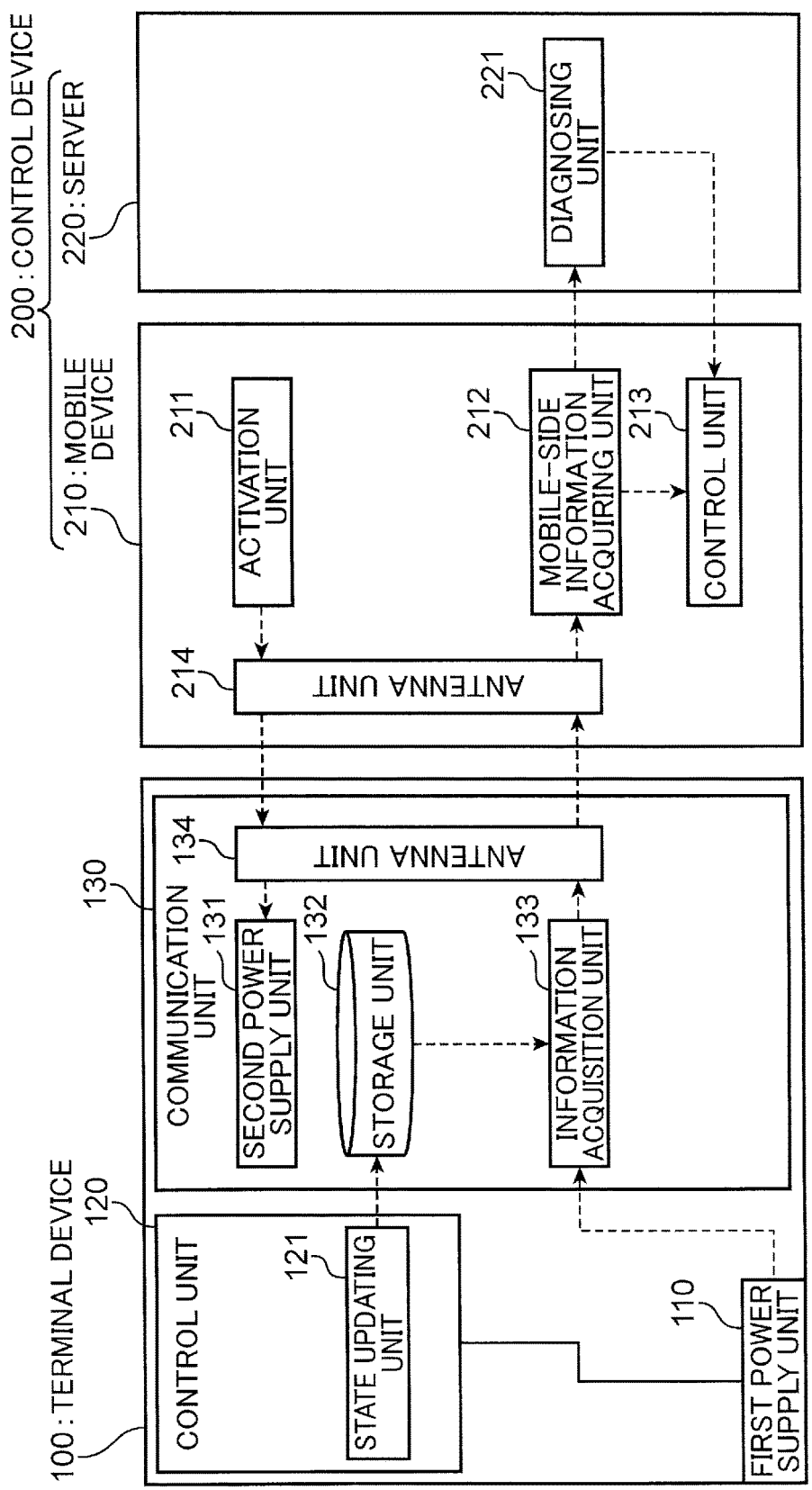
FIG. 11 is a block diagram of a fault diagnosis system according to a ninth embodiment of the present invention.

FIG. 11 is a block diagram of a fault diagnosis system according to a ninth embodiment of the present invention. The fault diagnosis system of the ninth embodiment has a configuration in which the control device 200 in the first embodiment is configured as a mobile device 210 and a server 220, and a diagnosing unit 221 is provided in the server 220. In the present embodiment, description of the same configuration as the first to eighth embodiments will not be provided.

The mobile device 210 is a mobile device such as a smartphone, a tablet terminal, or a mobile phone, for example, and is configured as a mobile device having a short-range wireless communication function and a communication function using a public communication network. The Internet and a cellular communication network, for example, may be employed as the public communication network.

The mobile device 210 includes an activation unit 211, a mobile-side information acquiring unit 212, a control unit 213, and an antenna unit 214. The activation unit 211 and the control unit 213 have the same functions as the activation unit 201 and the control unit 203 shown in FIG. 2, and description thereof will not be provided.

The mobile-side information acquiring unit 212 receives the first and second information transmitted from the information acquiring unit 133 via the antenna unit 214 and transmits the received first and second information to the server 220 via the public communication network.

The server 220 includes the diagnosing unit 221. The diagnosing unit 221 diagnoses faults in the terminal device 100 using the first and second information and the fault diagnosis table 300 similarly to the first embodiment. Moreover, the diagnosing unit 221 transmits the diagnosis results to the mobile device 210 via the public communication network. The control unit 213 displays the received diagnosis results on the display panel similarly to the first embodiment.

Next, the operation of the fault diagnosis system of the ninth embodiment will be described. The operations performed until the mobile device 210 is held over the terminal device 100 and the information acquiring unit 133 acquires the first and second information are the same as those of the first embodiment.

Next, the information acquiring unit 133 transmits the first and second information to the mobile device 210 via the antenna unit 134. The mobile-side information acquiring unit 212 having received the first and second information transmits the first and second information to the server 220 via the public communication network. Subsequently, the diagnosing unit 221 diagnoses faults in the terminal device 100 using the first and second information transmitted from the mobile-side information acquiring unit 212 and the fault diagnosis table 300 and transmits the diagnosis results to the mobile device 210 via the public communication network. Subsequently, the control unit 213 displays the diagnosis results on the display panel to inform the user of the diagnosis results.

As described above, according to the fault diagnosis system of the ninth embodiment, since the fault diagnosis process is performed by the server 220, it is possible to mitigate the processing load of the mobile device 210 and to accurately diagnose the faults in the terminal device 100 similarly to the first embodiment. The configuration in which the control device 200 is divided into the mobile device 210 and the server 220 and the fault diagnosis process is performed by the server 220 may be applied to the first to fourth embodiments.

(Tenth Embodiment)

Figure 13:
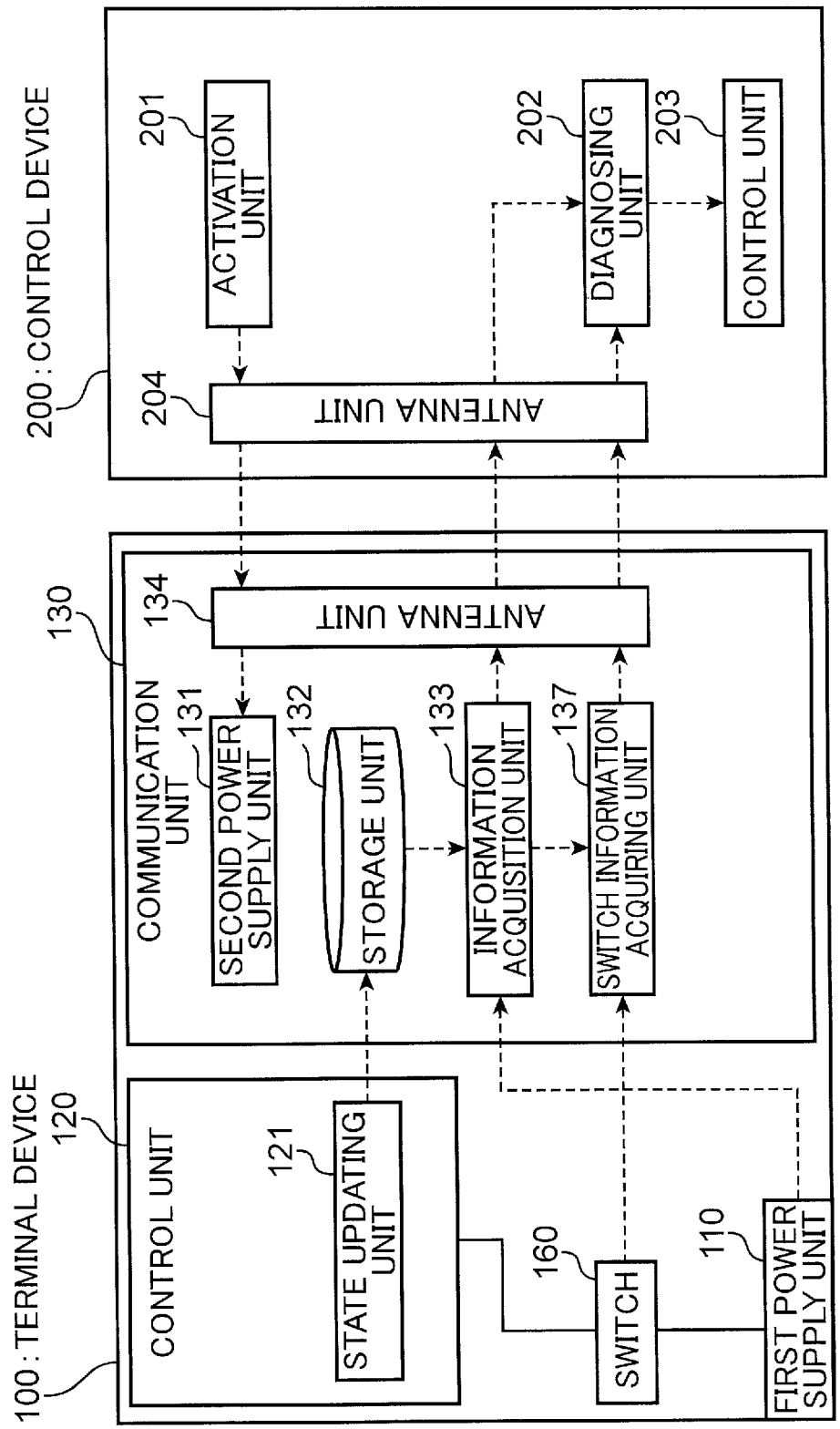
FIG. 13 is a block diagram of a fault diagnosis system according to a tenth embodiment of the present invention.

FIG. 13 is a block diagram of a fault diagnosis system according to a tenth embodiment of the present invention. The fault diagnosis system of the tenth embodiment has a configuration in which the state of a switch 160 is monitored in addition to the state of the first power supply unit 110, and faults in the terminal device 100 are diagnosed in more detail from both states.

The terminal device 100 of the present embodiment has a configuration in which the switch 160 is further provided in the terminal device 100 of the first embodiment and a switch information acquiring unit 137 is further provided in the communication unit 130.

The switch 160 is turned on and off by the user, for example. The switch 160 electrically connects the first power supply unit 110 and the control unit 120 when the switch 160 is turned on and disconnects the first power supply unit 110 from the control unit 120 when the switch 160 is turned off.

The switch information acquiring unit 137 operates with the electric power supplied from the second power supply unit 131 and acquires third information indicating whether the switch 160 is turned on or off. Moreover, upon acquiring the third information, the switch information acquiring unit 137 transmits the third information to the control device 200 via the antenna unit 134.

Figure 14:
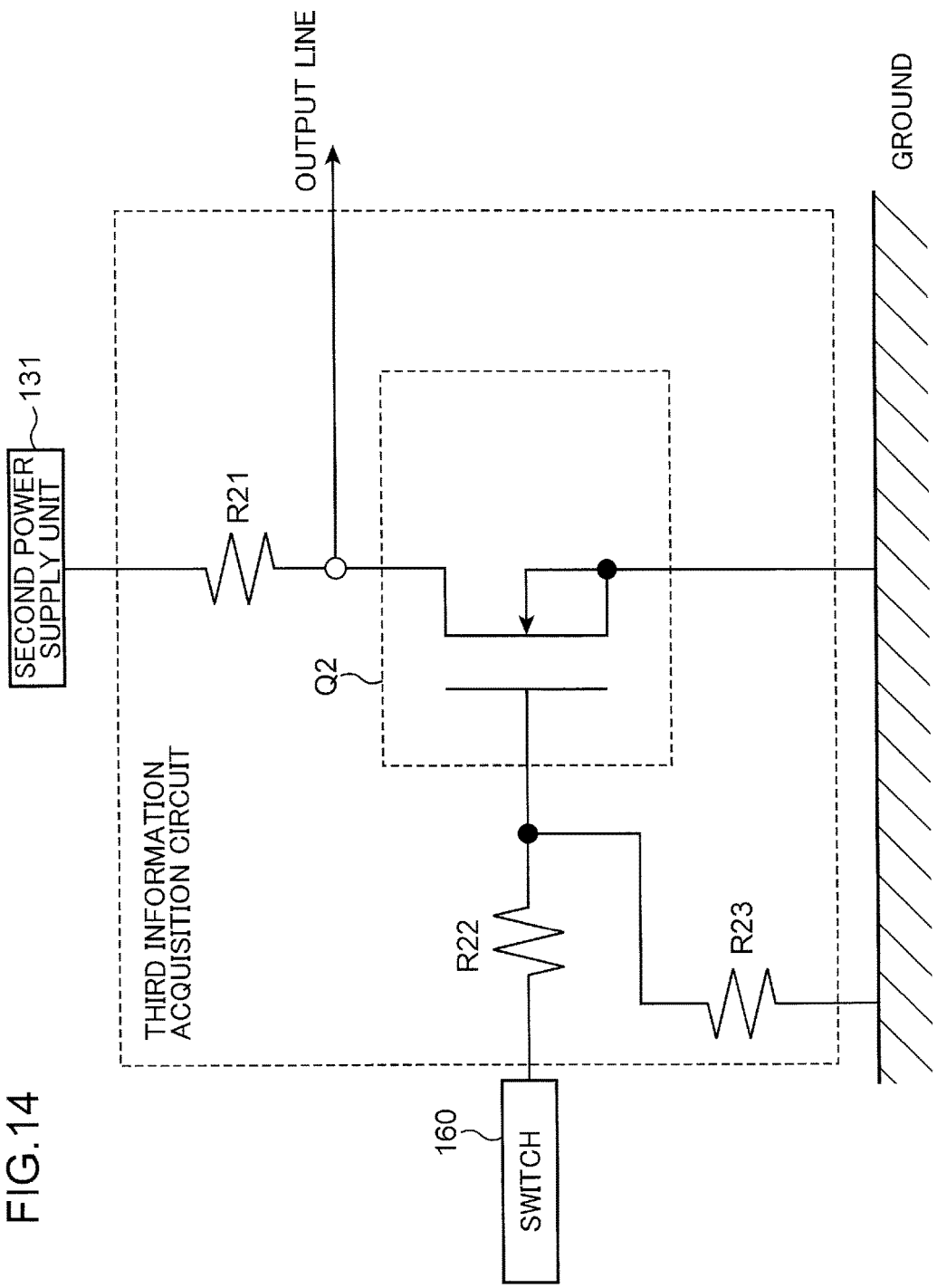
FIG. 14 shows an example of a circuit diagram of a third information acquisition circuit included in a switch information acquiring unit to acquire third information.

FIG. 14 shows an example of a circuit diagram of a third information acquisition circuit included in the switch information acquiring unit 137 to acquire the third information.

As shown in FIG. 14, the third information acquisition circuit includes three resistors R21 to R23 and a transistor Q2. The transistor Q2 is configured as an n-channel MOS-FET, for example. The transistor Q2 has a gate connected to the switch 160 via the resistor R22 and connected to the ground via the resistor R23. The transistor Q2 has a drain connected to the second power supply unit 131 via the resistor R21. The transistor Q2 has a source connected to the ground.

When the switch 160 is turned on, a high-level voltage is applied to the gate of the transistor Q1 and the transistor Q2 is turned on. As a result, when electric power is supplied from the second power supply unit 131, current flows between the source and drain of the transistor Q2, and a low-level voltage is output from an output line due to a voltage drop across the resistor R21. In this case, the switch information acquiring unit 137 determines that the switch 160 is turned on and generates third information indicating the on-state.

On the other hand, when the switch 160 is turned off, a low-level voltage is applied to the gate of the transistor Q2 and the transistor Q2 is turned off. As a result, when electric power is supplied from the second power supply unit 131, current does not flow between the source and drain of the transistor Q2, and a low-level voltage is output from the output line. In this case, the switch information acquiring unit 137 determines that the switch 160 is turned off, and generates the third information indicating the off-state.

In this manner, the switch information acquiring unit 137 determines that the switch 160 is turned on when the voltage output from the switch 160 is equal to or larger than a predetermined value and generates the third information indicating the on-state. On the other hand, the switch information acquiring unit 137 determines that the switch 160 is turned off when the voltage is smaller than the predetermined value and generates the third information indicating the off-state.

Returning to FIG. 13, the diagnosing unit 202 receives the first to third information transmitted from the terminal device 100 via the antenna unit 204 and diagnoses faults in the terminal device 100 using the first to third information and a fault diagnosis table 301 shown in FIG. 15.

FIG. 15 is a diagram showing an example of the fault diagnosis table 301 according to the tenth embodiment of the present invention. In the fault diagnosis table 301, when the second information indicates the power-supply state (that is, when the first power supply unit 110 is supplying electric power), a different diagnosis result is stored depending on whether the third information indicates the on-state or the off-state (that is, whether the switch 160 is turned on or off).

Specifically, in a case (Case (a)) where the first information indicates the active state, the second information indicates the power-supply state, and the third information indicates the on-state, electric power is supplied from the first power supply unit 110 due to the switch 160 being turned on and the control unit 120 is in the active state. Thus, "Normal (Active)" indicating that the control unit 120 is operating normally is stored in the Case (a) cell.

Moreover, in a case (Case (y)) where the first information indicates idle state, the second information indicates power-supply state, and the third information indicates the off-state, the supply of electric power from the first power supply unit 110 is interrupted due to the switch 160 being turned off, and the control unit 120 is in the idle state. Thus, "Normal (Idle)" indicating that the control unit 120 is normally idle is stored in the Case (y) cell. Moreover, in the case of Case (y), the third information indicates the off-state, and the switch 160 is turned off. Thus, "Switch-Off" indicating the switch 160 is turned off is also stored in the Case (y) cell.

Further, in a case (Case (c)) where the first information indicates the idle state, the second information indicates the power-supply state, and the third information indicates the on-state, the control unit 120 is in the idle state even when electric power is supplied from the first power supply unit 110 due to the switch 160 being turned on. Thus, "Fault" indicating that the control unit 120 has a fault is stored in the Case (c) cell.

Further, in a case (Case (x)) where the first information indicates the active state, the second information indicates the power-supply state, and the third information indicates the off-state, the control unit 120 which is to be in the idle state is in the active state because the supply of electric power from the first power supply unit 110 is interrupted due to the switch 160 being turned off. Thus, "Fault" indicating that the control unit 120 has a fault is stored in the Case (x) cell.

Further, in a case (Case (d)) where the first information indicates the active state and the second information indicates the non-power-supply state, the control unit 120 is in the active state even when no electric power is supplied from the first power supply unit 110. Thus, "Fault" indicating that the control unit 120 has a fault is stored in the Case (d) cell.

Further, in a case (Case (b)) where the first information indicates the idle state and the second information indicates the non-power-supply state, the control unit 120 is in the idle state because no electric power is supplied from the first power supply unit 110. Thus, "Normal (Idle)" indicating the control unit 120 is normally idle is stored in the Case (b) cell. Moreover, in the case of Case (b), the second information indicates the non-power-supply state, and the supply of electric power from the first power supply unit 110 is interrupted. Thus, "Plug-Off" indicating that the plug is plugged off is also stored in the Case (b) cell.

As described above, according to the fault diagnosis system of the tenth embodiment, the faults in the terminal device 100 are diagnosed by taking the third information indicating whether the switch 160 is turned on or off into account as well as the first and second information. Thus, it is possible to more accurately diagnose faults in the terminal device 100 using the first and third information when the second information indicates the power-supply state.

A method of diagnosing faults using the third information as well as the first and second information in the tenth embodiment can be applied to any one of the fault diagnosis systems according to the first to ninth embodiments.

SUMMARY OF EMBODIMENTS (1) A terminal device according to the present embodiment is a terminal device which performs short-range wireless communication with an external control device and the faults of which are diagnosed by the control device, the terminal device including: a first power supply unit that supplies electric power; an antenna unit that transmits and receives short-range radio waves to and from the control device; a second power supply unit that induces electric power from the radio waves received by the antenna unit and supplies the induced electric power; a storage unit that operates after receiving the supply of electric power from the second power supply unit; a control unit that operates after receiving the supply of electric power from the first power supply unit and stores in the storage unit first information indicating whether the control unit is in an active state or an idle state; and an information acquiring unit that operates after receiving the supply of electric power from the second power supply unit, acquires second information indicating whether electric power is supplied from the first power supply unit, acquires the first information from the storage unit, and transmits the acquired first and second information to the control device via the antenna unit.

According to this configuration, the terminal device includes the storage unit that stores the first information, the second power supply unit that receives radio waves of the short-range wireless communication from the control device to induce electric power, and the information acquiring unit that operates after receiving the supply of electric power from the second power supply unit, acquires the first and second information, and transmits the information to the control device 200.

Thus, the terminal device can transmit the first and second information to the control device 200 via the short-range wireless communication when the control device is held over the terminal device regardless of whether electric power is supplied from the first power supply unit.

As a result, the control device can acquire the first and second information from the terminal device regardless of whether the terminal device is turned on or off. Moreover, the first information indicates whether the control unit is in the active state or the idle state and the second information indicates whether electric power is supplied from the first power supply unit. Thus, the control device can detect a plug-off state,(i.e., and unplugged state), of the terminal device even when the control unit has a fault, from the combination of these items of information and can accurately detect the cause of faults in the terminal device.

(2) The terminal device may further include an activation signal generating unit that generates an activation signal for activating the control unit and transmits the activation signal to the control unit, in which the activation signal generating unit may generate the activation signal based on an instruction signal transmitted from the control device when there is a possibility that the control unit has a fault, and the information acquiring unit may acquire the first and second information again after the activation signal is transmitted from the activation signal generating unit and transmits the first and second information to the control device.

For example, it is assumed that the information acquiring unit acquired the first information indicating the idle state because the control unit is in the sleep state. In this case, it is also assumed that the information acquiring unit acquired the second information indicating the power-supply state. Then, there is a possibility that the control device diagnoses that the control unit has a fault because the control unit is in the idle state even when the first information indicates the idle state, the second information indicates the power-supply state, and electric power is supplied from the first power supply unit to the control unit.

Therefore, in this configuration, the activation signal generating unit that transmits the activation signal for activating the control unit upon receiving the instruction signal from the control device is provided in the terminal device. Due to this, for example, when the first information indicating the idle state and the second information indicating the power-supply state are transmitted from the terminal device and there is a high possibility that the control unit has a fault, the control device can transmit the instruction signal to the terminal device to try to activate the control unit.

If the control unit actually has a fault, since the control unit does not enter into the active state even when the activation signal is received, the first information maintains the idle state. On the other hand, if the control unit was in the sleep state, since the control unit enters into the active state upon receiving the activation signal, the first information is updated into the active state. Moreover, the information acquiring unit transmits the first and second information obtained in this manner to the control device again.

In this manner, the control device can diagnose that the control unit actually has a fault if the first information received again indicates the idle state and the second information indicates the power-supply state and diagnose that the control unit does not have a fault but is just in the sleep state if the first information indicates the active state and the second information indicates the power-supply state. As a result, it is possible to prevent a situation in which it is diagnosed that the control unit has a fault even when the control unit is in the sleep state.

(3) The terminal device may further include an activation signal generating unit that generates an activation signal for activating the control unit and transmits the activation signal to the control unit, in which the activation signal generating unit may generate the activation signal when the second information indicates that power is supplied, and the information acquiring unit may acquire the first and second information after the activation signal is transmitted from the activation signal generating unit and may transmit the first and second information to the control device.

For example, it is assumed that the information acquiring unit acquired the first information indicating the idle state because the control unit is in the sleep state. In this case, it is also assumed that the information acquiring unit acquired the second information indicating the power-supply state. Then, there is a possibility that, when these items of first and second information are transmitted to the control device as they were, the control device diagnoses that the control unit has a fault because the control unit is in the idle state even when electric power is supplied from the first power supply unit to the control unit.

Therefore, in this configuration, in order to prevent such a wrong diagnosis, the activation signal generating unit that transmits the activation signal for activating the control unit is provided in the terminal device. Due to this, the terminal device can try to activate the control unit upon receiving the second information indicating the power-supply state, for example.

If the control unit actually has a fault, since the control unit does not enter into the active state even when the activation signal is received, the first information maintains the idle state. On the other hand, if the control unit was in the sleep state, since the control unit enters into the active state upon receiving the activation signal, the first information is updated into the active state. Moreover, the information acquiring unit transmits the first and second information obtained in this manner to the control device.

In this manner, the control device can diagnose that the control unit has a fault if the received first information indicates the idle state and the second infoiniation indicates the power-supply state and diagnose that the control unit is normal if the first information indicates the active state and the second information indicates the power-supply state. As a result, it is possible to prevent a situation in which it is diagnosed that the control unit has a fault even when the control unit is in the sleep state.

(4) The terminal device may further include an auxiliary power supply unit that supplies electric power to the control unit to allow the control unit to update the first information stored in the storage unit when the supply of electric power from the first power supply unit is interrupted.

A case in which the plug of the terminal device is unexpectedly plugged off or the supply of electric power from the first power supply unit is unexpectedly interrupted due to contact errors of a power switch may happen. In this case, there is a problem in that the state updating unit may be unable to update the first information from the active state to the idle state. If the fault diagnosis process of the terminal device is executed in this situation, since the first information indicating the active state and the second information indicating the non-power-supply state are transmitted to the control device, there is a possibility that the control device diagnoses that the control unit has a fault even when the control unit does not have a fault.

Therefore, in this configuration, the auxiliary power supply unit is provided so that necessary electric power is supplied from the auxiliary power supply unit when the supply of electric power from the first power supply unit is interrupted, and that the state updating unit can reliably update the first information. As a result, it is possible to prevent the terminal device from stopping operating in a state where the supply of electric power from the first power supply unit is unexpectedly interrupted so that the first information is not updated from the active state to the idle estate. In this manner, it is possible to prevent a situation in which it is diagnosed that the control unit has a fault even when the control unit does not have a fault.

(5) The terminal device may further include a switch that electrically connects or disconnects the first power supply unit and the control unit; and a switch information acquiring unit that operates after receiving the supply of electric power from the second power supply unit, acquires third information indicating whether the switch is turned on or off, and transmits the third information to the control device via the antenna unit.

According to this configuration, the switch information acquiring unit that monitors the state of the switch that electrically connects or disconnects the first power supply unit and the control unit and transmits the third information indicating whether the switch is turned on or off to the control device is provided in the terminal device. Thus, the control device can more accurately diagnose faults in the terminal device using the third information in addition to the first and second information.

(6) A control device according to the present embodiment is a control device that performs short-range wireless communication with an external terminal device to diagnose faults in the terminal device, the terminal device including a first power supply unit that supplies electric power and a control unit that operates after receiving the supply of electric power from the first power supply unit, the control device including: an antenna unit that transmits and receives short-range radio waves to and from the terminal device; and a diagnosing unit that receives first information indicating whether the control unit included in the terminal device is in an active state or an idle state and second information indicating whether electric power is supplied from the first power supply unit included in the terminal device from the terminal device via the antenna unit and diagnoses faults in the terminal device based on the received first and second information.

According to this configuration, it is possible to provide the control device that performs short-range wireless communication with the terminal device described in (1) to acquire the first and second information from the terminal device, and diagnoses faults in the terminal device using the acquired first and second information.

(7) In the control device, the diagnosing unit may diagnose that the control unit has a fault when the second information indicates that a non-power-supply state is established and the first information indicates that the active state is established or when the second information indicates a power-supply state is established and the first information indicates the idle state is established and diagnoses that the control unit is normal when the second information indicates that the power-supply state is established and the first information indicates that the active state is established, or when the second information indicates that the non-power-supply state is established and the first information indicates that the idle state is established.

According to this configuration, when the second information indicates the non-power-supply state and the first information indicates the active state, it is diagnosed that the control unit has a fault because the control unit is in the active state even when electric power is not supplied. Moreover, when the second information indicates the power-supply state and the first information indicates the idle state, it is diagnosed that the control unit has a fault because the control unit is in the idle state even when electric power is supplied.

Moreover, when the second information indicates the power-supply state and the first information indicates the active state, it is diagnosed that the control unit is normal because the control unit is in the active state after receiving the supply of electric power from the first power supply unit. Further, when the second information indicates the non-power-supply state and the first information indicates the idle state, it is diagnosed that the control unit is normal because the control unit is in the idle state in response to the interruption of the supply of electric power from the first power supply unit.

(8) The control device may further include an instruction signal transmitting unit that transmits an instruction signal for activating the control unit when there is a possibility that the control unit has a fault to the terminal device via the antenna unit.

According to this configuration, the control device can transmit the instruction signal to the terminal device described in (2) and try to activate the control unit. As a result, it is possible to prevent a situation in which it is diagnosed that the control unit has a fault even when the control unit is in the sleep state.

(9) In the control device, the instruction signal transmitting unit may transmit the instruction signal when the second information indicates that the power-supply state is established and the first information indicates that the idle state is established.

According to this configuration, when the second information indicates the power-supply state and the first information indicates the idle state, the control device can transmit the instruction signal to the terminal device described in (2) and try to activate the control unit by determining that there is a possibility that the control unit has a fault. As a result, it is possible to prevent a situation in which it is diagnosed that the control unit has a fault even when the control unit is in the sleep state.

(10) In the control device, the diagnosing unit may acquire from the terminal device third information indicating whether a switch that electrically connects or disconnects the first power supply unit and the control unit of the terminal device is turned on or off and diagnoses faults in the terminal device based on the third information in addition to the first and second information.

According to this configuration, it is possible to more accurately diagnose faults in the terminal device further using the third information transmitted from the terminal device described in (5).

(11) A terminal device according to the present embodiment is a terminal device which performs short-range wireless communication with an external control device and the faults of which are diagnosed by the control device, the terminal device including: a first power supply unit that supplies electric power; an antenna unit that transmits and receives short-range radio waves to and from the control device; a second power supply unit that induces electric power from the radio waves received by the antenna unit and supplies the induced electric power; a storage unit that operates after receiving the supply of electric power from the second power supply unit; a control unit that operates after receiving the supply of electric power from the first power supply unit and stores in the storage unit first information indicating whether the control unit is in an active state or an idle state; an information acquiring unit that operates after receiving the supply of electric power from the second power supply unit, acquires second information indicating whether electric power is supplied from the first power supply unit, and acquires the first information; a diagnosing unit that operates after receiving the supply of electric power from the second power supply unit, diagnoses faults in the terminal device based on the first and second information acquired by the information acquiring unit, and transmits diagnosis results to the control device via the antenna unit.

According to this configuration, it is possible to obtain the same advantage as (1) in the configuration in which the diagnosing unit that diagnoses faults in the terminal device using the first and second information is provided in the terminal device.

(12) The terminal device may further include an activation signal generating unit that generates an activation signal for activating the control unit and transmits the activation signal to the control unit, in which the activation signal generating unit may generate the activation signal when the second information indicates that a power-supply state is established, and the information acquiring unit may acquire the first and second information after the activation signal is transmitted from the activation signal generating unit and transmits the first and second information to the control device.

According to this configuration, it is possible to obtain the same advantage as (3) in the configuration in which the diagnosing unit that diagnoses faults in the terminal device using the first and second information is provided in the terminal device.

(13) The terminal device may further include an activation signal generating unit that generates an activation signal for activating the control unit and transmits the activation signal to the control unit, in which the activation signal generating unit may generate the activation signal when the second information indicates that a power-supply state is established and the first information indicates that the idle state is established, and the information acquiring unit may acquire the first and second information after the activation signal is transmitted from the activation signal generating unit and transmits the first and second information to the control device.

According to this configuration, it is possible to obtain the same advantage as (2) in the configuration in which the diagnosing unit that diagnoses faults in the terminal device using the first and second information is provided in the terminal device.

(14) In the terminal device, the diagnosing unit may diagnose that the control unit has a fault when the second information indicates that a non-power-supply state is established and the first information indicates that the active state is established or when the second information indicates that a power-supply state is established and the first information indicates that the idle state is established and may diagnose that the control unit is normal when the second information indicates that the power-supply state is established and the first information indicates the active state, or when the second information indicates the non-power-supply state and the first information indicates the idle state.

According to this configuration, it is possible to obtain the same advantage as (7) in the configuration in which the diagnosing unit that diagnoses faults in the terminal device using the first and second information is provided in the terminal device.

(15) The terminal device may further include an auxiliary power supply unit that supplies electric power to the control unit to allow the control unit to update the first information stored in the storage unit when the supply of electric power from the first power supply unit is interrupted.

According to this configuration, it is possible to obtain the same advantage as (5) in the configuration in which the diagnosing unit that diagnoses faults in the terminal device using the first and second information is provided in the terminal device.

(16) A fault diagnosis system according to the present embodiment is a fault diagnosis system in which a control device and a terminal device perform short-range wireless communication and the control device diagnoses faults in the terminal device, the terminal device including: a first power supply unit that supplies electric power; an antenna unit that transmits and receives short-range radio waves to and from the control device; a second power supply unit that induces electric power from the radio waves received by the antenna unit and supplies the induced electric power; a storage unit that operates after receiving the supply of electric power from the second power supply unit; a control unit that operates after receiving the supply of electric power from the first power supply unit and stores in the storage unit first information indicating whether the control unit is in an active state or an idle state; and an information acquiring unit that operates after receiving the supply of electric power from the second power supply unit, acquires second information indicating whether electric power is supplied from the first power supply unit, acquires the first information from the storage unit, and transmits the acquired first and second information to the control device via the antenna unit, and the control device including: an antenna unit that transmits and receives short-range radio waves to and from the terminal device; and a diagnosing unit that receives the first and second information from the terminal device via the antenna unit and diagnoses faults in the terminal device based on the received first and second information.

A fault diagnosis system in which the terminal device described in (1) and the control device described in (6) are combined may be provided.

INDUSTRIAL APPLICABILITY

The present invention is useful in a fault diagnosis system of home appliances using a mobile terminal or a tablet terminal that is expected to become more wide spread in the future because the control device communicates with the terminal device via short-range wireless communication to diagnose faults in the terminal device.

The invention claimed is:

1. A terminal device which performs short-range wireless communication with an external control device and the faults of which are diagnosed by the control device,
  the terminal device comprising:
  a first power supply unit that converts electric power supplied via a plug so as to be suitable for control of the terminal device, and supplies the electric power;
  an antenna unit that transmits and receives short-range radio waves to and from the control device;
  a second power supply unit that induces electric power from the radio waves received by the antenna unit and supplies the induced electric power;
  a storage unit that operates after receiving the supply of electric power from the second power supply unit;
  a control unit that operates after receiving the supply of electric power from the first power supply unit and stores in the storage unit first information indicating whether the control unit is in an active state or an idle state, the control unit including a state updating unit which updates the first information stored in the storage unit into an active state when a state of the control unit transitions from the idle state to the active state, and updates the first information stored in the storage unit into an idle state when the state of the control unit transitions from the active state to the idle state; and
  an information acquiring unit that operates by using the electric power from the second power supply unit when the supply of electric power from the second power supply unit starts, acquires second information indicating whether electric power is supplied from the first power supply unit to the control unit, acquires the first information from the storage unit, and transmits the acquired first and second information to the control device via the antenna unit, wherein
  the terminal device is configured by a home appliance having a short-range wireless communication function,
  the control device is configured by a mobile device having a short-range communication function, and
  the control device diagnoses that the control unit is operating normally when a first scenario exists, wherein the first scenario is that the second information indicates a power supply state and the first information indicates the active state,
  that the control unit is idling normally when a second scenario exists, wherein the second scenario is that the second information indicates a non-power-supply state and the first information indicates the idle state,
  that the control unit has a fault and the plug is plugged in when a third scenario exists, wherein the third scenario is that the second information indicates the power-supply state and the first information indicates the idle state, and
  that the control unit has a fault and the plug is unplugged when a fourth scenario exists, wherein the fourth scenario is that the second information indicates the non-power-supply state and the first information indicates the active state.

2. The terminal device according to claim 1, further comprising:
  an activation signal generating unit that generates an activation signal for activating the control unit and transmits the activation signal to the control unit, wherein
  the activation signal generating unit generates the activation signal based on an instruction signal transmitted from the control device when there is a possibility that the control unit has a fault, and
  the information acquiring unit acquires the first and second information again after the activation signal is transmitted from the activation signal generating unit and transmits the first and second information to the control device.

3. The terminal device according to claim 1, further comprising:
  an activation signal generating unit that generates an activation signal for activating the control unit and transmits the activation signal to the control unit, wherein
  the activation signal generating unit generates the activation signal when the second information indicates that power is supplied, and
  the information acquiring unit acquires the first and second information after the activation signal is transmitted from the activation signal generating unit and transmits the first and second information to the control device.

4. The terminal device according to claim 1, further comprising:
  an auxiliary power supply unit that supplies electric power to the control unit to allow the control unit to update the first information stored in the storage unit when the supply of electric power from the first power supply unit is interrupted.

5. The terminal device according to claim 1, further comprising:
  a switch that electrically connects or disconnects the first power supply unit and the control unit; and a switch information acquiring unit that operates after receiving the supply of electric power from the second power supply unit, acquires third information indicating whether the switch is turned on or off, and transmits the third information to the control device via the antenna unit.

6. A control device that performs short-range wireless communication with the terminal device of claim 1 to diagnose faults in the terminal device, the control device comprising:

an antenna unit that transmits and receives short-range radio waves to and from the terminal device; and a diagnosing unit that receives, from the terminal device via the antenna unit, the first information indicating whether the control unit included in the terminal device is in an active state or an idle state and the second information indicating whether electric power is supplied from the first power supply unit included in the terminal device, and diagnoses faults in the terminal device based on the received first and second information, wherein the terminal device is configured by a home appliance having a short-range wireless communication function, the control device is configured by a mobile device having a short-range communication function, and the diagnosing unit diagnoses that the control unit is operating normally when a first scenario exists, wherein the first scenario is that the second information indicates a power supply state and the first information indicates the active state, that the control unit is idling normally when a second scenario exists, wherein the second scenario is that the second information indicates a non-power-supply state and the first information indicates the idle state, that the control unit has a fault and the plug is plugged in when a third scenario exists, wherein the third scenario is that the second information indicates the power-supply state and the first information indicates the idle state and that the control unit has a fault and the plug is unplugged when a fourth scenario exists, wherein the fourth scenario is that the second information indicates the non-power-supple state and the first information indicates the active state.

7. The control device according to claim 6, further comprising:

an instruction signal transmitting unit that transmits an instruction signal for activating the control unit when there is a possibility that the control unit has a fault to the terminal device via the antenna unit.

8. The control device according to claim 7, wherein the instruction signal transmitting unit transmits the instruction signal when the second information indicates that the power-supply state is established and the first information indicates that the idle state is established.

9. The control device according to claim 6, wherein the diagnosing unit acquires from the terminal device third information indicating whether a switch that electrically connects or disconnects the first power supply unit and the control unit of the terminal device is turned on or off and diagnoses faults in the terminal device based on the third information in addition to the first and second information.

10. A terminal device which performs short-range wireless communication with an external control device, the terminal device comprising:

a first power supply unit that converts electric power supplied via a plug so as to be suitable for control of the terminal device, and supplies the electric power;

an antenna unit that transmits and receives short-range radio waves to and from the control device;

a second power supply unit that induces electric power from the radio waves received by the antenna unit and supplies the induced electric power;

a storage unit that operates after receiving the supply of electric power from the second power supply unit;

a control unit that operates after receiving the supply of electric power from the first power supply unit and stores in the storage unit first information indicating whether the control unit is in an active state or an idle state, the control unit including a state updating unit which updates the first information stored in the storage unit into an active state when a state of the control unit transitions from the idle state to the active state, and updates the first information stored in the storage unit into an idle state when the state of the control unit transitions from the active state to the idle state;

an information acquiring unit that operates by using the electric power from the second power supply unit when the supply of electric power from the second power supply unit starts, acquires second information indicating whether electric power is supplied from the first power supply unit to the control unit, and acquires the first information;

a diagnosing unit that operates after receiving the supply of electric power from the second power supply unit, diagnoses faults in the terminal device based on the first and second information acquired by the information acquiring unit, and transmits diagnosis results to the control device via the antenna unit, wherein the terminal device is configured by a home appliance having a short-range wireless communication function, the control device is configured by a mobile device having a short-range communication function, and the diagnosing unit diagnoses that the control unit is operating normally when a first scenario exists, wherein the first scenario is that the second information indicates a power supply state and the first information indicates the active state, that the control unit is idling normally when a second scenario exists, wherein the second scenario is that the second information indicates a non-power-supply state and the first information indicates the idle state, that the control unit has a fault and the plug is plugged in when a third exists, wherein the third scenario is that the second information indicates the power-supply state and the first information indicates the idle state, and that the control unit has a fault and the plug is unplugged when a fourth scenario exists, wherein the fourth scenario is that the second information indicates a power supply the non-power-supply state and the first information indicates the active state.

11. The terminal device according to claim 10, further comprising:

an activation signal generating unit that generates an activation signal for activating the control unit and transmits the activation signal to the control unit, wherein the activation signal generating unit generates the activation signal when the second information indicates that power is supplied, and the information acquiring unit acquires the first and second information after the activation signal is transmitted from the activation signal generating unit and transmits the first and second information to the diagnosing unit.

12. The terminal device according to claim 10, further comprising:

an activation signal generating unit that generates an activation signal for activating the control unit and transmits the activation signal to the control unit, wherein the activation signal generating unit generates the activation signal when the second information indicates that a power-supply state is established and the first information indicates that the idle state is established, and the information acquiring unit acquires the first and second information after the activation signal is transmitted from the activation signal generating unit and transmits the first and second information to the diagnosing unit.

13. The terminal device according to claim 10, further comprising:

an auxiliary power supply unit that supplies electric power to the control unit to allow the control unit to update the first information stored in the storage unit when the supply of electric power from the first power supply unit is interrupted.

14. A fault diagnosis system in which a control device and a terminal device perform short-range wireless communication and the control device diagnoses faults in the terminal device, the terminal device comprising:

a first power supply unit that converts electric power supplied via a plug so as to be suitable for control of the terminal device, and supplies the electric power;

an antenna unit that transmits and receives short-range radio waves to and from the control device;

a second power supply unit that induces electric power from the radio waves received by the antenna unit and supplies the induced electric power;

a storage unit that operates after receiving the supply of electric power from the second power supply unit;

a control unit that operates after receiving the supply of electric power from the first power supply unit and stores in the storage unit first information indicating whether the control unit is in an active state or an idle state, the control unit including a state updating unit which updates the first information stored in the storage unit into an active state when a state of the control unit transitions from the idle state to the active state, and updates the first information stored in the storage unit into an idle state when the state of the control unit transitions from the active state to the idle state; and an information acquiring unit that operates by using the electric power from the second power supply unit when the supply of electric power from the second power supply unit starts, acquires second information indicating whether electric power is supplied from the first power supply unit, acquires the first information from the storage unit to the control unit, and transmits the acquired first and second information to the control device via the antenna unit, and the control device comprising:

an antenna unit that transmits and receives short-range radio waves to and from the terminal device; and a diagnosing unit that receives the first and second information from the terminal device via the antenna unit and diagnoses faults in the terminal device based on the received first and second information, wherein the terminal device is configured by a home appliance having a short-range wireless communication function, the control device is configured by a mobile device having a short-range communication function, and the diagnosing device diagnoses that the control unit is operating normally when a first scenario exists, wherein the first scenario is that the second information indicates a power supply state and the first information indicates the active state, that the control unit is idling normally when a second scenario exists, wherein the second scenario is that the second information indicates a non-power-supply state and the first information indicates the idle state, that the control unit has a fault and the plug is plugged in when a third scenario exists, wherein the third scenario is that the second information indicates the power-supply state and the first information indicates the idle state and that the control unit has a fault and the plug is unplugged when a fourth scenario exists, wherein the fourth scenario is that the second information indicates the non-power-supply state the first information indicates the active state.

15. A fault diagnosis method of causing a control device and a terminal device to perform short-range wireless communication and causing the control device to diagnose faults in the terminal device, the terminal device being configured by a home appliance having a short-range wireless communication function to have: a first power supply unit that converts electric power supplied via a plug so as to be suitable for control of the terminal device, and supplies the electric power; an antenna unit that transmits and receives short-range radio waves to and from the control device; a second power supply unit that induces electric power from the radio waves received by the antenna unit and supplies the induced electric power; a control unit that operates after receiving the supply of electric power from the first power supply unit and stores first information indicating whether the control unit is in an active state or an idle state in a storage unit; and an information acquiring unit that operates by using the electric power from the second power supply unit when the supply of the electric power from the second power supply unit starts, the control unit including a state updating unit which updates the first information stored in the storage unit into an active state when a state of the control unit transitions from the idle state to the active state, and updates the first information stored in the storage unit into an idle state when the state of the control unit transitions from the active state to the idle state, and the control device being configured by a mobile device having a short-range wireless communication function to have an antenna unit that transmits and receives short-range radio waves to and from the terminal device; and a diagnosing unit that diagnoses faults in the terminal device, the fault diagnosis method comprising the steps of:

allowing the second power supply unit of the terminal device to receive the radio waves from the control device via the antenna unit thereby operating the information acquiring unit and the storage unit;

allowing the information acquiring unit of the terminal device to acquire second information indicating whether electric power is supplied from the first power supply unit to the control unit when the information acquiring unit operates when the supply of electric power from the second power supply unit starts and allowing the information acquiring unit to acquire the first information from the storage unit thereby transmitting the acquired first and second information to the control device via the antenna unit; and allowing the diagnosing unit of the control device to receive the first and second information transmitted from the information acquiring unit via the antenna unit and to diagnose faults in the terminal device based on the received first and second information, and to diagnose that the control unit is operating normally when a first scenario exists, wherein the first scenario is that the second information indicates a power supply state and the first information indicates the active state, that the control unit is idling normally when a second scenario exists, wherein the second scenario is that the second information indicates a non-power-supply state and the first information indicates the idle state, that the control unit has a fault and the plug is plugged in when a third scenario exists, wherein the third scenario is that the second information indicates the power-supply state and the first information indicates the idle state and that the control unit has a fault and the plug is unplugged when a fourth scenario exists, wherein the fourth scenario is that the second information indicates a power supply the non-power-supply state and the first information indicates the active state.

* * * * *